(12) United States Patent
Leung et al.

(10) Patent No.: US 12,549,790 B2
(45) Date of Patent: Feb. 10, 2026

(54) INTEGRATION OF PLATFORMS FOR MULTI-PLATFORM CONTENT ACCESS

(71) Applicant: Block, Inc., Oakland, CA (US)

(72) Inventors: Alvin Leung, Oakland, CA (US);
Michael Druker, Kitchener (CA);
Christopher Hua, San Francisco, CA (US)

(73) Assignee: Block, Inc., Oakland, CA (US)

( * ) Notice: Subject to any disclaimer, the term of this patent is extended or adjusted under 35 U.S.C. 154(b) by 237 days.

(21) Appl. No.: 17/564,702

(22) Filed: Dec. 29, 2021

(65) Prior Publication Data

US 2023/0209116 A1 Jun. 29, 2023

(51) Int. Cl.
| | |
|---|---|
| H04N 21/254 | (2011.01) |
| H04N 21/2543 | (2011.01) |
| H04N 21/45 | (2011.01) |
| H04N 21/4627 | (2011.01) |
| H04N 21/472 | (2011.01) |
| H04N 21/478 | (2011.01) |
| H04N 21/6334 | (2011.01) |

(52) U.S. Cl.
CPC ..... *H04N 21/2542* (2013.01); *H04N 21/2543* (2013.01); *H04N 21/4532* (2013.01); *H04N 21/4627* (2013.01); *H04N 21/47211* (2013.01); *H04N 21/47815* (2013.01); *H04N 21/6334* (2013.01)

(58) Field of Classification Search
CPC ........... H04N 21/2542; H04N 21/2543; H04N 21/4532; H04N 21/4627; H04N 21/47211; H04N 21/47815; H04N 21/6334

See application file for complete search history.

(56) References Cited

U.S. PATENT DOCUMENTS

| | | | | |
|---|---|---|---|---|
| 2002/0069176 | A1* | 6/2002 | Newman | G06Q 20/24 705/40 |
| 2008/0209491 | A1* | 8/2008 | Hasek | H04N 21/2225 348/E7.071 |
| 2012/0330786 | A1* | 12/2012 | Paleja | G06Q 30/0635 709/217 |
| 2013/0185206 | A1* | 7/2013 | Leggett | G06Q 20/40 705/44 |
| 2014/0040129 | A1* | 2/2014 | Akin | G06Q 20/384 705/44 |
| 2015/0156201 | A1* | 6/2015 | New | H04L 63/10 726/31 |
| 2015/0254441 | A1* | 9/2015 | Sanso | G06F 21/41 726/9 |
| 2018/0146258 | A1* | 5/2018 | James | H04N 21/4532 |
| 2019/0034888 | A1 | 1/2019 | Grassadonia et al. | |
| 2020/0042971 | A1 | 2/2020 | Eby et al. | |
| 2020/0304863 | A1* | 9/2020 | Domm et al. | G06F 3/04886 |
| 2021/0217077 | A1* | 7/2021 | Drynan | G06K 7/1095 |

\* cited by examiner

*Primary Examiner* — Chenea Davis
(74) *Attorney, Agent, or Firm* — Polsinelli PC

(57) ABSTRACT

Techniques described herein are directed to integration of platforms for multi-platform content access. In an example, a user may request access to access-restricted content. A payment application on the user device that requested access may communicate with an associated payment service to automatically pay for the access without requiring additional user input, or may request the user to confirm that the payment is desired. This may be performed across content provider platforms and in a way that allows subsequent access to the content regardless of the platform used to request the content.

20 Claims, 17 Drawing Sheets

INTEGRATION OF PLATFORMS FOR MULTI-PLATFORM CONTENT ACCESS

TECHNICAL FIELD

Content providers have found multiple ways to offer content on computing devices. The number and type of content providers has also increased. Access to content from the content providers may vary.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
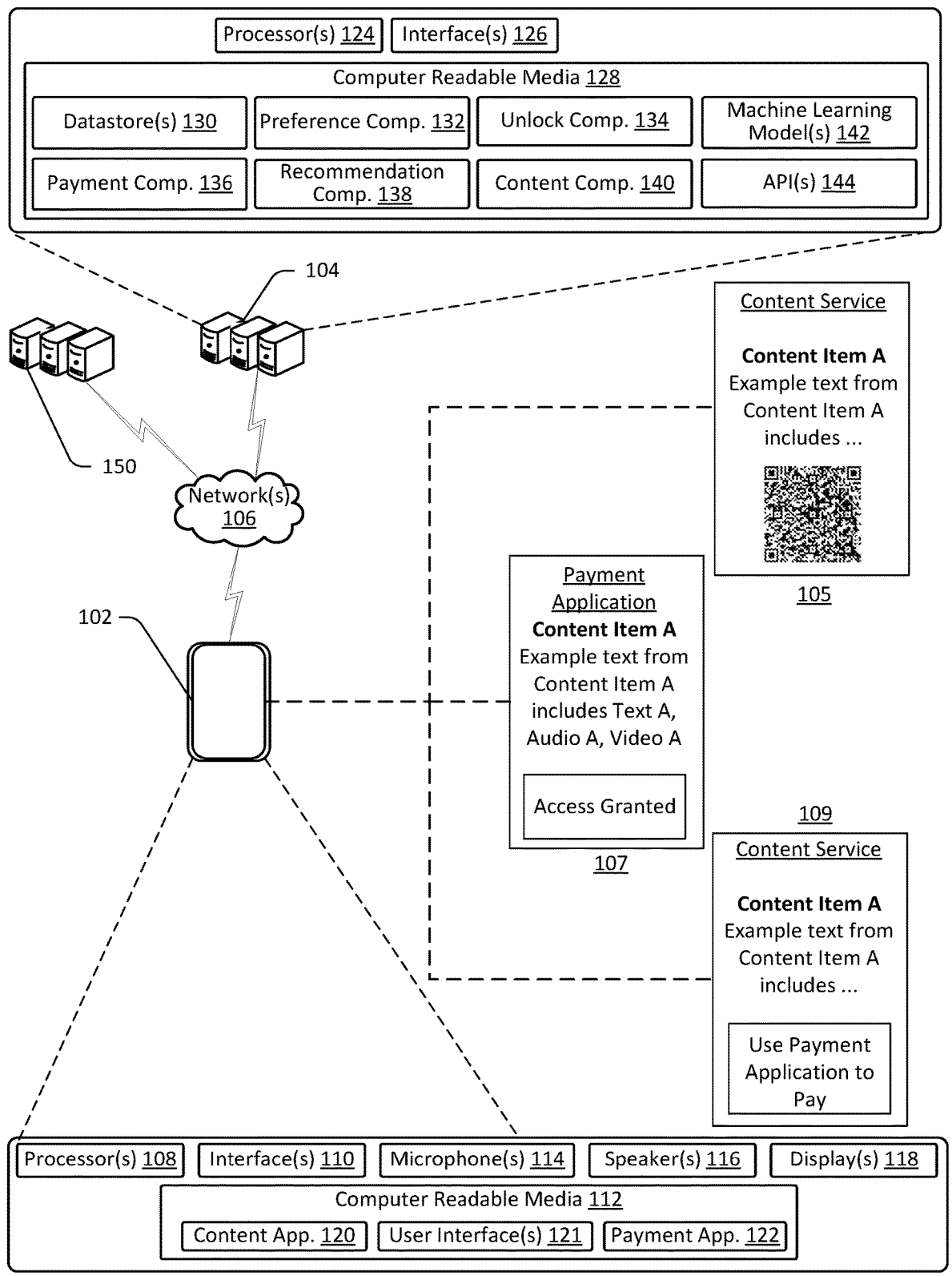
FIG. 1 is an example environment for integration of platforms for multi-platform content access, according to an embodiment described herein.

Techniques described herein are directed to, among other things, the generation and use of a system that integrates various content provider platform(s) with a payment platform to provide frictionless, or low-friction, access to digital content provided by the content provider platforms. With physical content, such as newspapers, books, tapes, compact discs, or the like, it is easier for content creators or publishers to control access and distribution of such physical content. A user does not have access to a physical newspaper content unless the user subscribes to the newspaper or otherwise obtains a physical copy of the newspaper. Or, a user does not have access to physical book content unless the user purchases the book or otherwise obtained a physical copy of the book. With the proliferation of digital content, there is a computer-centric problem of controlling access and distribution of such physical content. Once a content item is digitized, there are few ways to control who can access or distribute such digital content. In existing technologies, content providers utilize various access-restriction mechanisms, such as paywalls (i.e., a mechanism to restrict access to content unless a user subscribes to or otherwise purchases such content), geographic restrictions, age restrictions, or the like to restrict access to content. Techniques described herein relate to the integration of content provider platform(s) with a payment platform to enable users to quickly access digital content provided by such content provider platforms with little or no input at the time such access is requested. That is, techniques described herein offer a computer-centric solution to enabling users to access digital content provided by content provider platforms with little to no friction at the point users request to access such digital content. In some cases, the access is at least one of contextual, e.g., based on what the category of the information a user is interested in, or conditional, e.g., timed so that access to the information expires after predefined time.

For example, a user may utilize a user device to view digital content associated with multiple content provider platforms. For the purpose of this discussion, a content provider platform can comprise one or more software or hardware components connected via one or more networks for providing content provisioning services. Such content providers can facilitate the provisioning of digital content to users. Digital content, as used herein, can include, but is not limited to publications, written articles, books, newspapers, podcasts, music, audio files, video files, images, non-fungible tokens (NFTs), or the like. In at least one example, a user device may have stored thereon, or otherwise may have available, one or more applications configured to retrieve digital content, such as from an online source, and display or otherwise present the digital content to the user. In a non-limiting example, the digital content may be an article and the application may be an application associated with a content publisher (e.g., The Journal) or the digital content may be an audio file (i.e., a song) and the application can be a music streaming service. In some examples, the digital content can be freely accessible without restrictions. However, in other examples, "access-restricted" digital content may require a satisfaction of a condition, such as a subscription, a payment, or the like before the digital content is made available to the user. Examples of access-restricted content may include paywall-restricted content, geographically-restricted content, age-restricted content, domain-restricted content, etc. In these examples, when the user requests to access access-restricted digital content, a paywall or other type of a user interface indicating that satisfaction of a condition is required may be displayed to the user, thereby preventing the user from accessing the digital content.

In an example where a paywall is restricting access to digital content, in conventional technologies, the user may enter the user's payment information and any other information requested by the content provider to authorize payment to view the content. That is, in such an example, the paywall may indicate that payment is required to view an item of digital content. In other examples, in existing technologies, the paywall may indicate that payment for a subscription, such as a monthly subscription, to digital content provided by the content publisher is required to view the item of digital content. In any event, the user cannot access the digital content until payment—or another condition—is satisfied.

As described above, conventional technologies for controlling access to digital content introduce a great degree of friction by requiring, in some examples, a number of user interactions and the entry of sensitive financial information before a user can view requested digital content. In some cases, the platform where the financial information is entered and where the digital content is requested may be different, thereby exposing user's personal information to hackers. This may also lead to users deciding not to access to the digital content, introduce opportunities for nefarious actors to acquire the sensitive information, require users to remember what digital subscriptions have already been purchased, dissuade users from utilizing certain content providers, and introduce the computer-centric problem of how to integrate multiple content provider platforms to streamline digital content access. Further, conventional technologies introduce problems relating to data security, network congestion, and the like. Techniques described herein offer solutions to the above-identified problems with conventional technologies, as well as other solutions.

To address computer-centric problems identified herein, the present disclosure describes techniques for integration of platforms for multi-platform content access. As an example, a user may download or otherwise acquire a payment application for use on a user device. The payment application may be utilized for a number of functionalities, including but not limited to requesting payment and transferring payments to other user accounts, making direct deposits, making bank transfers, filing tax forms, making payments such as contactless payments, making payments in lieu of a physical payment card, investing, purchasing or otherwise exchanging cryptocurrency, surfacing content, viewing payment activity, managing preferences, etc. In some implementations, the payment application may be a third-party application, such as a music streaming application or a social networking application with an embedded payment mechanism, for example to pay for music or items advertised on the social networking platform, respectively. The payment application may be configured to execute in the foreground and background of the user device. For example, the payment application may be configured to execute in the foreground when a user is actively engaged in one or more of the functionalities of the payment application. In other examples, the payment application may be configured to execute in the background when a user is not actively engaged in one or more of the functionalities, but the application is still "open" and is capable of communicating with other applications on the user device or with a payment service associated with the payment application. Taking an example where the payment application is executing in the background of the user device, the user may be utilizing another application to view and request access to digital content. For example, the application may be associated with a content provider or a content publisher. As indicated above, when the user requests access to access-restricted digital content associated with the content provider, a paywall, or other blocker, is displayed that requests payment information to enable access to the digital content. However, utilizing the techniques described herein, the payment application may be used to enable access to the access-restricted digital content with little or no user interaction at the time of the request, and within a third-party application, e.g., through a deep link integration of the payment application within the third-party application.

In an example, a user may provide user input to an application or other user interface indicating a request to access digital content that is access-restricted. It should be understood that the application may be a web application, a native application, an instant application (e.g., a part of an application), etc. The request may be received at the content provider, which may initiate a process for determining whether access has been previously granted to the digital content, and if not, what is needed to grant access. The content provider may communicate with an unlock component of the payment service, and the unlock component may determine whether access has already been granted. If access has not been granted, the unlock component may communicate with the payment component to facilitate payment for digital content access. The unlock component may communicate with the content publisher and the user device at issue to indicate when access is enabled and to facilitate the content publisher to display the digital content on the user device. In some examples, the web browser, application, part of the application, or the like can be provided by a content provider, including but not limited to a publishing service, a music label, a content aggregation service, or the like. In some examples, the web browser, application, part of the application, or the like can be provided by the payment service.

Techniques described herein provide several advantages to existing techniques. To start, techniques allow for integration of multiple content providers by utilizing the payment service as a platform configured to communicate with the multiple content providers. Additionally, by having a system with the payment application installed on the user device attempting to access the content, the payment application and its associated payment service may communicate with each other in a secure manner as both portions of the system are associated with the same entity and/or are managed together. Additionally, the inclusion of the unlock component allows for determining whether digital content has already been purchased before querying resources of the payment component, saving computing resources and minimizing connection with the payment component.

In some examples, once access has been granted to specific digital content or digital content associated with a specific content provider or publisher, the payment service may be utilized to allow for continued or subsequent access to the digital content. For example, the user may provide input requesting subsequent viewing of the digital content. In some examples, previously accessed digital content can be accessed via a content provider or the payment application. In some examples, previously accessed digital content can be surfaced when determined, based on context data, to be relevant to a user. Additionally, or alternatively, the payment application may be utilized to display functionality for managing subscriptions to access-restricted content. For example, the payment application may include a user interface for "subscriptions" or otherwise indicating user preferences and stored data associated with accessing content. In some examples, the payment application or payment service can exchange or maintain authorization or authentication requests with content providers to enable repeated viewing or subscription management with little to no friction for requesting users at the time of the request.

The user interface related to digital content subscriptions described above provides a host of benefits. For example, this user interface may be utilized to manage subscriptions, access content providers, subject matters, content publishers, devices, etc., all in a single user interface. In some examples, the user interface can enable users to perform payment functionalities and access content in the context of performing such payment functionalities. In some examples, the user interface can aggregate content that has been purchased or otherwise acquired from one or more content providers using techniques described herein. Additionally, the user interface provides an opportunity for users to visualize at least one of subscriptions or digital content purchases made utilizing the payment application or payment service, giving a more complete understanding of the digital content that has been accessed as well as the monetary amounts spent on such subscriptions. That is, the user interface described herein enables streamlined user interaction with computing devices, thereby offering an improvement over conventional technology.

In addition to improvements described above, techniques described herein relate to the generation of new data associated with content access to enable users to access access-restricted digital content. By way of example, access tokens specific to a given user account are generated "on-the-fly" (e.g., in real-time or near real-time) when a request to access digital content is received and with little or no input from a user requesting to access the digital content at the time of the request. The use of tokens or other access credentials provides for a secure way of enabling access regardless of the user device being used, when the user account being used is associated with credentials indicating that the requested digital content has been enabled for access. As such, users can access purchased content from any user device from which they are using the payment service. In one implementation, such access tokens can be connected to apportioned or specific digital content such that the user gets access to apportioned or specific digital content, e.g., one article, instead of the entire source of digital content. In another example, the access tokens allow access to the subscription associated with another individual, e.g., a contact in the user's contact list, such that a new subscription is not registered and an existing registration is used to provide access to the user requesting digital content. In one implementation, the most efficient (for example, based on economics, speed, etc.) mechanism of providing access to digital content is selected.

In existing technologies, to enable access to access-restricted digital content users are typically required to provide sensitive data, such as payment data, to a content provider with requests to access such digital content. This can introduce security concerns. Techniques described herein, however, enable secure communication of sensitive data between the payment application and a related payment service to enable access to access-restricted digital content. For example, given that the payment application and the payment service are associated with the same system, encryption of communication between the payment application and the payment service may be private and may not require the use publicly-available resources, such as APIs, to establish communication between the two. Additionally, given the sensitive nature of the information being communicated between the payment application and the payment service, the information can be readily obscured, tokenized, hashed, etc. to reduce opportunities for nefarious attacks on the system.

The solutions described herein also improve upon networking issues associated with digital content provisioning. Specifically, in conventional technologies, the provisioning of digital content may include the use of multiple disparate systems and devices. For example, in conventional technologies, a user device requests digital content, a content provider associated with an application used by make the request provides the digital content, a content publisher generates the digital content, a payment system initiates transactions, etc. Given the number of user devices, user accounts, payment systems, content providers, content publishers, etc., conventional digital content provisioning involves various network calls and data exchanges. For example, difficulties arise when attempting to create networks between content providers, payment platforms, user devices, etc. for the purpose of paying for access to digital content, and unavailability of a certain network adds delays to the content access process. A user device requests the digital content, and then that device must securely communicate with the content provider, a payment system, or other systems to ultimately have the requested digital content enabled. This introduces security risks to the network of devices and systems and also requires that all of these networks and systems be working correctly and in alignment to achieve the result of enabling the digital content. Integration of various platforms is described herein offer solutions to network issues arising from conventional technologies in a way that allows for a preferred payment application(s) and payment service to be utilized across multiple content provider platforms to enable access to access-restricted digital content and to manage digital content access in a seamless fashion, without users needing to continually provide user input to gain access or remember how and which content provider platforms enable access to what digital content. By so doing, regardless of the user device being used or the content publisher, the same payment service and payment application may be utilized to securely communicate requests for access to digital content utilizing a payment application residing on the device at issue and a payment service that is part of the same system as the payment application. In one implementation, machine learning models can indicate primary and secondary content provider platforms based on e.g., user preferences, type of digital content, context, etc. Further the payment application can automatically switch to a secondary content provider platform if a primary content provider platform is down, unresponsive for a certain period of time, or otherwise not able to fulfill the request for digital content. This switching can happen at the backend unbeknownst to the user, and ensures that the digital content is presented in a consistent and frictionless manner, factoring in network delays.

Techniques described herein include the generation of machine learning models, generation of new training datasets, training of machine learning models, and the use of those trained machine learning models to assist in the content platform integration and content-based recommendations, as described in more detail below. This can enable techniques described herein to be more personalized or customized for users. For example, techniques described herein can offer personalized or customized recommendations for digital content to access, automated payments for digital content having particular characteristics, subscriptions to be configured for enabling access to digital content, or the like. By way of example, the machine learning models may be utilized to determine what digital content a given user is likely to want access to or digital content to grant access to in light of previously-accessed content. Additionally, the machine learning models may be utilized to determine what characteristics of digital content, such as publishers, subject matter, etc., are likely to be consumed by the user and to recommend automatic payment for access to such content. Furthermore, the machine learning models may be utilized to identify situations where a user pays for digital content access to multiple types of digital content, but where alternative subscriptions would result in additional digital content access for the same or a similar price, or where alternative subscriptions would result in a decreased price for access to similar digital content.

For example, the payment service may be configured to generate recommendations associated with access-restricted digital content. In some examples, such recommendations can be actionable, such that interaction with a recommendation can cause the payment service to perform one or more operations without further input from users for whom the recommendations are generated. For example, when a user purchases access to digital content utilizing the techniques described herein, data indicating details of such purchases may be stored. This historical transaction data may be utilized to identify trends in the user's digital content access. These trends may include, for example, certain subject matter that is frequently accessed, certain content providers frequently used, certain content publishers that are frequently accessed, and amounts paid. As such, the payment service may generate an actionable recommendation from which the user can purchase content associated with the certain subject matter via a single interaction, without confirmation, or, in some examples, without any further input (i.e., automatically). When a user pays to access certain content a given number of times or otherwise with a given frequency, a recommendation may be generated that indicates a subscription to a given content provider is advisable. For example, say a user accesses 20 articles a month from The Journal, each time paying a per-article price of $0.50 for access. In this scenario, the user spends $10 per month on access to articles from The Journal. The payment service may utilize this data as well as subscription cost data to determine whether it is advisable to purchase a monthly subscription to The Journal instead of paying per article. In some examples, the payment service can provide an actionable recommendation from which the user can configure a subscription via a single interaction, without confirmation, or, in some examples, without any further input (i.e., automatically).

The payment service may be configured to receive feedback data associated with the content access operations described herein. The feedback data may indicate positive and/or negative experiences with utilizing the payment application to enable content access. This feedback data may be collected and utilized to improve the use of the payment application to enable content access. For example, the feedback data may be formatted as input data (or otherwise training data) to one or more machine learning models. This input may be utilized to train or update the machine learning models, which may be utilized by the various components of the systems described herein to perform one or more of the operations described with respect to those systems. In this way, techniques described herein can utilize data provided by users or otherwise commenters for generating better user preferences, recommendations, and content experiences.

These computer-centric solutions to the computer-centric problems described herein may be utilized to integrate content platforms for multi-platform content access without, in examples, any user input associated with payment for such access. In some examples, such access can be provided with greatly reduced interaction than what is used in conventional techniques. As such, techniques described herein offer various technical advantages, as described above, as well as others as will be described herein.

It should be noted that the exchange of data and/or information as described herein may be performed where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed where a user has provided consent for performance of the operations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for integration of platforms for multi-platform content access, according to an embodiment described herein. The environment 100 of FIG. 1 may include a user device 102 and a payment service 104, which can communicate via network(s) 106. Additional details associated with the user device 102, the payment service 104, and the network(s) 106 are described below with reference to FIGS. 12-16.

The user device 102 may include one or more components such as one or more processors 108, one or more network interfaces 110, computer-readable media (CRM) 112, one or more microphones 114, one or more speakers 116, and/or one or more displays 118. The microphones 114 may be configured to receive audio input from the environment 100 and to generate corresponding audio data, which may be utilized as discussed herein. The speakers 116 may be configured to output audio, such as audio corresponding to at least a portion of the content output by the user device 102. The displays 118 may be configured to present graphical user interfaces. In some examples, the displays 118 can output images, videos, or the like via such graphical user interfaces.

The CRM 112 may include one or more applications or other components. For example, the one or more applications or other components can include a content application 120, user interface 121, and a payment application 122. For the purpose of this disclosure, and as described above, "content" can refer to digital content including but not limited to publications, written articles, books, newspapers, podcasts, music, audio files, video files, images, non-fungible tokens (NFTs), or the like. A "content publisher" can include an entity or system that generated or otherwise stores data representing content. A "content provider" can include an entity or system that makes the content available. In examples, the content publisher may be a content provider 150. In some examples, a content provider 150 can be a content aggregation service, a social networking service, a streaming service, or the like. Any reference to a content provider 150 can refer to any one or more of a content publisher, content aggregation service, social networking service, streaming service, combination of the foregoing, or any other entity or system that generates or makes content available. A user interface 121 can be included in a payment application 122 as an interstitial, widget, or pop-up display. For example, the digital content from the content application 120 can be surfaced on the payment application 122 after formatting the digital content in a format suitable for the payment application 122.

The content application 120 may be associated with one or more of content providers 150 (e.g., content aggregation services, content streaming services, social networking services, etc.), content publishers, or the payment service. For example, a content application may be disposed on the user device 102 for accessing content, and a payment application may be disposed on the user device 102 for facilitating payments or other functionalities.

The payment application 122 may be utilized for a number of functionalities, including but not limited to requesting payment and transferring payments to other user accounts, making direct deposits, making bank transfers, filing tax forms, making payments such as contactless payments, making payments in lieu of a physical payment card, investing, purchasing or otherwise exchanging stocks, cryptocurrency, or other assets, surfacing content, purchasing content, viewing payment activity, managing preferences, etc.

The applications or other components may be configured to execute in the foreground and background of the user device 102. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the application 122 is still "open" and is capable of communicating with other applications on the user device and/or with payment service 104 associated with the payment application 122. For example, the content application 120 may be executing in the foreground and a request to access digital content may be received via the content application 120. The payment application 122, running in the background, may be utilized to facilitate enabling access to the digital content as described more fully below. In examples, the digital content may be requested and accessed utilizing the content application 120, and the payment application 122 may be utilized to facilitate access to the digital content. In some such examples, the payment application 122 can transition to the foreground to perform payment operations or can remain in the background and payment operations can be performed without the payment application 122 transitioning to the foreground. In other examples, the payment application 122 itself may be utilized to surface digital content, receive digital content access requests, or otherwise perform some or all of the functionality of the content application 120. That is, in some examples, the payment application 122 can run in the foreground and can access content via integrations with the content application 120 or other content providers 150 or the like that are running in the background or the like.

The payment service 104, which can be associated with one or more computing devices, such as server computing devices, may include components such as one or more processors 124, one or more network interfaces 126, and/or CRM 128. The CRM 128 may include one or more components such as, for example, datastore(s) 130, a preference component 132, an unlock component 134, a payment component 136, a recommendation component 138, a content component 140, machine learning model(s) 142, and API(s) 144. These components will be described below by way of example.

In at least one example, the payment service 104 can expose functionality and/or services via the one or more APIs 144, thereby enabling functionality and/or services described herein to be integrated into various functional components of the environment 100. The API(s) 144, which can be associated with the payment service 104, can expose functionality described herein and/or avail payment services to various functional components associated with the environment 100. At least one of the API(s) 144 can be a private API, thereby availing services and/or functionalities to functional components (e.g., applications, etc.) that are developed internally (e.g., by developers associated with the payment service). At least one of the API(s) 144 can be an open or public API, which is a publicly available API that provides third-party developers (e.g., content providers 150 described herein) with programmatic access to a proprietary software application or web service of the payment service. That is, the open or public API(s) can enable functionality and/or services of the payment service to be integrated into one or more applications for accessing content. The API(s)

144 can include sets of requirements that govern how applications, or other functional components, can interact with one another.

In some examples, the payment service can provide third-party entities with a software developer kit ("SDK") that may utilize functionality exposed by the API(s) 144. The SDK can include software development tools that allow a third-party developer (i.e., a developer that is separate from the payment service) to include functionality and/or avail services as descried herein. The SDK and/or the API(s) 144 may include one or more libraries, programming code, executables, other utilities, and documentation that allows a developer to directly include functionality and/or avail services described herein within an application, such as third-party applications providing content access services, as described herein.

The datastore(s) 130 can store, among other types of data, user profiles. For instance, a user profile of the user can store payment data associated with payment instrument(s) or user account(s) of a user. In some examples, an account maintained by the payment service on behalf of the user can be mapped to, or otherwise associated with, the user profile. Such an account can be associated with a stored balance maintained by the payment service. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include tokens or other indications of purchased content, subscriptions, user preferences, user transaction data, or the like. Additional details associated with data that can be stored in association with user profiles are provided below.

In some examples, the datastore(s) 130 can store user profiles of content publishers or content providers 150, as described herein. In some examples, such user profiles can be associated with one or more user accounts. In some examples, a user account associated with a user profile of a content publisher or content provider 150 can be associated with a stored balance maintained by the payment service or external account data for withdrawing or depositing funds. Additional details are provided below.

As described above, the environment 100 may include the user device 102 and/or the payment service 104.

In at least one example, the user device 102 can be configured to display content associated with multiple content providers. For example, the user device 102 may have stored thereon, or otherwise may have available, one or more applications or other components configured to retrieve content, such as from a content provider 150, content publisher, or other content source, and display or otherwise present the content to the user. In a non-limiting example, the content may be an article accessible from an application associated with a content publisher (e.g., The Journal) or a content provider 150 (e.g., a service that makes content from one or more publishers available to users).

In some examples, content can be "access-restricted." In some examples, access-restricted content may require satisfaction of a condition before access to the content is granted. In some examples, such a condition can correspond to a payment (e.g., payment-restricted), activation of a subscription (e.g., subscription-restricted), presence in a geographic location (e.g., geo-restricted), association with a particular age (e.g., age-restricted), or the like. In an example where access-restricted content requires a subscription or other payment before the content is made available to the user, in conventional technologies, when a user selects the access-restricted content for viewing, a paywall or other user interface indicating that payment is required can be presented via the user device 102 to block, or otherwise restrict, access to the selected content. In at least one example, such a user interface can include functionality for receiving payment. In conventional technologies, the user may enter the user's payment information and any other information requested by the content provider to authorize payment to view the content. In some examples, the paywall may indicate that payment is required to view a single content item (e.g., an article) at issue, while in other examples, the paywall may indicate that payment for a subscription, such as a monthly subscription, to content provided by the content publisher is required to view the content item.

In an example where the payment application 122 is executing in the background of the user device 102, the user may be utilizing another application or component to view and request access to content. For example, the application may be associated with a content provider or a content publisher, as described above. As indicated above, when the user requests access to access-restricted content associated with the content provider, typically a paywall is displayed that requests payment information to enable access to the content. However, utilizing the techniques described herein, the payment application 122 may be used to enable access to the access-restricted content with little or no user interaction.

In an example, a user may provide user input to an application or other user interface indicating a request to access content that is access-restricted. For illustrative purposes, the application can be associated with a content provider 150. The request may be received at the content provider, which may initiate a process for determining whether access has been previously granted to the content, and if not, what is needed to gain access. When the request is received, the content provider may send an authorization request to the payment service 104 associated with the payment application 122. To do so, the content provider may have pre-registered for the services provided by the payment service 104, either through the payment service 104 or by generation of the platforms described herein. In other examples, instead of registration, the payment application 122 may be detected on the user device 102 and that detection may result in the content application 120 authenticating itself with the payment application 122, either before receiving the content access request or in response to the request to access the digital content. As such, the content application 120 can send the authorization request to the payment service 104 via the content provider 150. In yet an additional example, a user can select to pay for access to the content using the payment service 104, in which case, the content provider 150 can send the authorization request to the payment service 104.

The authorization request may include an indication of the user request to access the access-restricted content as well as identifying information, such as information associated with the user device 102, a payment application 122, or a user account associated with the user. In some examples, the authorization request can include an identifier of the content (e.g., for identifying the content), a publisher, content provider 150, or other merchant identifier (e.g., for identifying the source of the content), an indication of a condition to be satisfied (e.g., a cost associated with a payment to be made) to access the content, or the like.

The unlock component 134 may receive the authorization request. The unlock component 134 can determine whether access to such content has already been granted. For example, once access has been granted to specific content or content associated with a specific content provider or publisher, the payment service 104 may be utilized to allow for continued or subsequent access to the content. For example, the user may provide input requesting subsequent viewing of the content, such as on the same user device 102 that the content was viewed on originally or a different device associated with the same user account. The content provider 150 may receive the request and may send the authorization request to the unlock component 134. The unlock component 134 may query the datastore 130, such as utilizing an identifier of the user account or the user device 102, to determine whether access has already been granted for the content at issue. For example, the access token or other credentials that were utilized to enable access to the content originally may be stored and queried for subsequent use. In other examples, the datastore 130 may store indications of content that is accessible to the user account and utilize that data to determine whether the content in question has already been enabled for viewing in association with the user account. The datastore 130 may return data indicating that access has already been granted to the content at issue.

Based at least in part on a determination, by the payment service 104, that access to the content has already been enabled, the unlock component 134 may send an authorization response to the content provider, which may utilize the response to cause the content to be displayed for the user. For example, the content provider may provide the content data corresponding to the content to the user device 102 in a way that causes presentation of the content on the user device 102. It should be noted that subsequent access to the content need not be on the same user device that originally viewed the content, nor does the access need to be from the same publisher or content provider or application utilized to access content. Instead, the access token generated when access is originally enabled may be utilized regardless of the platform being utilized to access the content.

If access has not already been granted, the unlock component 134 can initiate a process for payment to "unlock," or otherwise grant, access to the content. Access to the digital content can take various forms. For example, access may be automatically enabled and payment automatically made utilizing the payment application 122, for example, when user preferences authorize doing so. In other examples, an interactive element (e.g., a quick response (QR) code, a barcode, a link, or the like) as described in more detail herein may be displayed and selected by the user, which may enable the payment application 122 to be used for payment of the content access. In still other examples, selection of a displayed paywall and/or the interactive element may cause the payment application 122 to execute in the foreground of the user device 102 such that a user may provide user input to the payment application 122 to complete payment for content access. In still other examples, access may be granted when the content is associated with one or more characteristics, such as subject matter, content publisher, etc. or the request satisfies one or more rules. The rules may be set by user preferences or may be the payment service 104 or may be set based on machine learning results, recommendation interaction by the user, etc. In examples, determining the subject matter or other characteristics of the digital content may be based on metadata associated with the digital content or analysis of the content, such as word-based analysis, image-based analysis, audio-based analysis, etc.

In an example, a preference component 132 may query the datastore(s) 130 to access account data associated with the user account of the user. The account data may include a host of information, but may include one or more user preferences associated with content access. The user preferences may take any form and may include any preference, but for example the user preferences may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain content publishers, certain content types (e.g., books, newspapers, songs, images, videos, podcasts, etc.), certain subject matters, certain monetary amounts, certain periods of time that the rules are to be in force, rules associated with certain platforms, etc. That is, a user preference can indicate that content associated with a particular characteristic (e.g., content provider 150, content publisher, content type, subject matter, monetary amount, etc.) can be purchased via a particular withdrawal rule (e.g., automatic withdrawal, withdrawal with confirmation, withdrawal based on request, etc.). User preferences, as described herein, can enable the user or the payment service 104 to configure the user preferences to tailor the user experience for granting access to access-restricted content. The preference component 132 may return results indicating the user preferences to the unlock component 134 for further processing.

Take, for example, a situation where the user preferences indicate that access to the requested content may be enabled automatically without additional user input. In this example, the unlock component 134 may send the authorization request to the payment component 136 configured to facilitate withdrawal of funds from the user account. When the user preferences or preferences of the payment service 104 or the content provider indicate that some additional user confirmation should be provided before funds are withdrawn, the payment component 136 may send a code, link, or other interactive element to the unlock component 134. The unlock component 134 may then send the interactive element to the content provider to cause display of the interactive element on the user device 102. The user may select the element to confirm that fund withdrawal is authorized. In examples, selection of the interactive element may be based on the form of the interactive element. For example, the interactive element may include a link that is clicked on, a QR code that is scanned, a digital button that is "pressed," etc. It should be understood that in some examples, the device requesting access may be the same device that includes the payment application 122. However, in other examples, the request may be received at a first device and the interactive link, for example, a QR code, may be displayed on that first device. Then a second device having the payment application may scan or otherwise interact with the interactive element to facilitate the remaining operations as described herein.

When the interactive element is selected, the payment application 122 on the user device 102 may initiate payment for access to the content. To initiate payment, the payment application 122 may send a payment authorization request to the unlock component 134. The unlock component 134 may then send an access token request or other access credentials to the payment component 136 indicating the user has confirmed that withdrawal of funds should be made to pay for the content access. The payment component 136 may generate and send the requested access token back to the unlock component 134, which may utilize the access token to secure payment for content access. For example, a payment request that includes the access token may be sent to the payment component 136, which may confirm that the access token is authentic and may withdraw the funds for granting access to the access-restricted content. The funds may be deposited or otherwise associated with an account of the content publisher. The unlock component 134 may receive an indication that the withdrawal has occurred and may send a response to the content publisher indicating that access to the requested content should be granted. The content publisher may utilize the response to grant access to the requested content and may cause the user device 102 to display the requested content for viewing by the user.

In at least one example, the user device 102 can present one or more user interfaces 121. The user interface(s) 121 can be presented by the content application 120, the payment application 122, another application, a web browser, a part of an application (e.g., an instant application), or the like. User interface(s) 121 can take the form of user interfaces 105, 107, and 109, which provide non-limiting examples of techniques described herein. For example, the user interface 105 shows a scenario where an interactive element (e.g., a QR code) is displayed, and when selected, is utilized to cause the payment application 122 to facilitate payment for content access. In such an example, the payment application 122 can be running in the background and the content can be presented via the content application 120 running in the foreground. Integration of the content provider 150 associated with the content application 120 and the payment service 104 can enable presentation of the interactive element.

The user interface 107 shows a scenario where access to the content is granted automatically without user input, including in examples where the request to access the content was received from the payment application 122 itself instead of the content application 120. That is, as described above, in some examples, access to content can be granted based on a determination that access has previously been granted or the content is associated with an active subscription (e.g., of the user or the payment service 104). In some examples, access to content can be granted automatically based on execution of one or more rules, as described above. In some examples, such rule(s) can relate to preference(s) or the like. Such an "automatic" process can enable access to content via an automatic withdrawal of funds from an account of the requesting user without the user having to provide additional input.

The user interface 109 shows a scenario where user input is provided to enable access to the content. In an example, the payment service 104 can determine that the user preferences do not allow for automatic authorization for Content Item A, but instead requires user input. In such an example, the user can interact with the prompt to use the payment application to pay for access and the content application can trigger a payment flow as described above. In such an example, the payment application 122, which can be running in the background, can transition to the foreground or remain in the background.

As illustrated in the user interfaces 105 and 107, content can be accessed from a content service, content publisher, or other content source. In some examples, the payment application 122 may be utilized to surface content to the user and to include options and functionality for accessing content that is or was access-restricted. For example, the content component 140 of the payment service 104 may be configured to determine available content that is relevant to a user. In some examples, such a determination can be based at least in part on context data indicating operations being performed by the user. For example, the context data may indicate a location of the user device 102, content being viewed currently on the user device 102, a portion of the payment application 122 being utilized, etc. By way of example, the user may be utilizing the payment application 122 to view stock information about a given company. This context data may be utilized to surface digital content about the stock, about the given company, about the stock market in question, etc. Relevance of the digital content may be based at least in part on keywords determined to be illustrative of the digital content, such as by semantic analysis techniques (e.g., term frequency inverse document frequency processes). In some examples, a word-based analysis, image-based analysis, audio-based analysis can be used to identify the keywords. In some examples, one or models, such as machine-learning models, can be used to determine relevance or similarity between content and operations being performed or to be performed by the user.

In some examples, the content component 140 can surface indicators of available content determined to be relevant to the user via a user interface presented by the payment application 122. In some examples, content determined to be relevant to the user can be previously purchased, available for purchase, or combinations of the foregoing. In some examples, indicators of the content determined to be relevant to the user may include a name of the content publisher, a title of the content or otherwise an identifier of the content, as well as an indicator of whether the content is access restricted or otherwise requires payment before being accessible, and when access-restricted a monetary indicator of what payment is required to access the content, for example. To access the access-restricted content from the payment application 122, the user may select the content and depending on the user preferences associated with user account, the payment application 122 and payment service 104 may automatically withdraw the funds to pay for access and enable content access, or may request the user to confirm the withdrawal before proceeding. Once access to the content is enabled, the user interface may be updated such that the indicator of access-restriction is removed as well as the indicator of monetary amount needed. In these examples, selection of the content may cause the content to be displayed, whether in the payment application 122 or another application configured to display the content. The user interface 120 may also include an option to "manage preferences" or otherwise to provide user input on preferences for accessing access-restricted content, as described herein.

Additionally, or alternatively, the payment application 122 may be utilized to display functionality for managing subscriptions to access-restricted content. For example, the payment application may include a user interface for "subscriptions" or otherwise indicating user preferences and stored data associated with accessing content. The user interface may include indicators of "active subscriptions" or otherwise an indication of what content access has already been purchased and is otherwise "active." The active subscriptions may include content publisher indicators, subject matter indicators, application indicators, and amounts associated therewith. In some examples, an active subscription can be associated with an individual user, a group of users, or the payment service. This view of active subscriptions may provide a user with an on-the-fly presentation of what user preferences have been established for the user account, such as which content publishers have been selected, which subject matter has been selected, and how much the payment application has been authorized to withdraw for each. In some examples, the payment application 122 can serve as a sign-in mechanism such that a user can sign-in across content provider platforms and sites with which the user has configured a subscription with a single interaction (e.g., one tap).

Additionally, or alternatively, the recommendation component 138 may be configured to generate recommendations associated with access-restricted content. For example, when a user purchases access to content utilizing the techniques described herein, data indicating details of such purchases may be stored. This historical transaction data may be utilized by the recommendation component 138 to identify trends in the user's content access. These trends may include, for example, certain subject matter that is frequently accessed, certain content providers frequently used, certain content publishers that are frequently accessed, and amounts paid. When a user pays to access certain content a given number of times or otherwise with a given frequency, a recommendation may be generated that indicates a subscription to a given content provider is advisable. For example, say a user accesses 20 articles a month from The Journal, each time paying a per-article price of $0.50 for access. In this scenario, the user spends $10 per month on access to articles from The Journal. The recommendation component 138 may utilize this data as well as subscription cost data to determine whether it is advisable to purchase a monthly subscription to The Journal instead of paying per article. The recommendation component 138 may also utilize data indicating subject matter preferences to make this recommendation, as described in more detail herein. In some examples, recommendations can be surfaced as "actionable recommendations" such that when a user interacts with an actionable recommendation, an associated action (e.g., purchase, subscription, etc.) can be configured without further input from the user.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein. The determined user profile may be utilized to customize how content access is surfaced.

Figure 2:
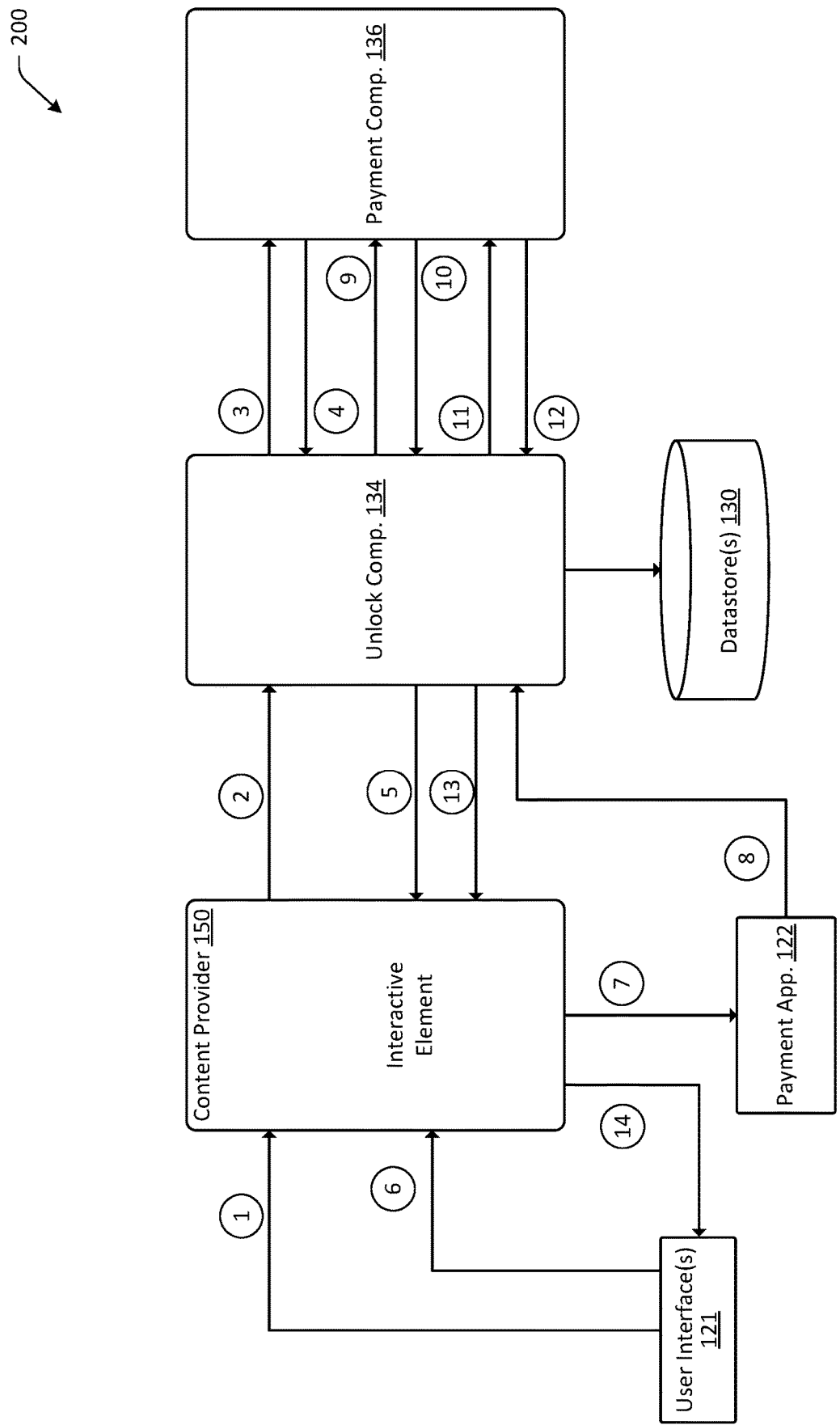
FIG. 2 is an example conceptual diagram showing components of a system utilized for integration of platforms for multi-platform content access, according to an embodiment described herein.

FIG. 2 is an example conceptual diagram showing components of a system utilized for integration of platforms for multi-platform content access, according to an embodiment described herein. The environment 200 of FIG. 2 may include a user device 102 that is being used to request access to access-restricted content. FIG. 2 may also include some of the same components as described with respect to FIG. 1. For example, the environment 200 may include an unlock component 134 and a payment service 136. The environment 200 may also include a content provider 150 and one or more datastores 130. Example operations performed by the various components in the environment 200 is provided below by way of steps 1-14 (represented by encircled numbers in FIG. 2), however it should be understood that fewer or more steps may be involved and the steps need not be performed in the order described by way of example below.

For example, at step 1, a user may provide user input to a user interface 121, which can be presented via a web browser, an application, part of an application, or the like. The user input can comprise touch input, spoken input, a gesture, or the like. In some examples, the user interface 121 can be presented by the content application 120, which can be associated with the content provider 150. The user input can indicate a request to access content provided by a content provider, such as the content provider 150 illustrated in FIG. 2, for example, while performing a transaction on a payment application, like the payment application 122. In some examples, the web browser, application, part of the application, or the like from which user input may be received can be provided by the payment service instead of a content provider, as illustrated in FIG. 2. In examples where the request is received at the content provider 150, a content application 120 may be executing the foreground and the payment application 122 may be operating in the background. In examples where the request is received at the payment application, the payment application may be executing in foreground. In some examples, the content associated with the user input can be access-restricted, as described above.

Figure 3:
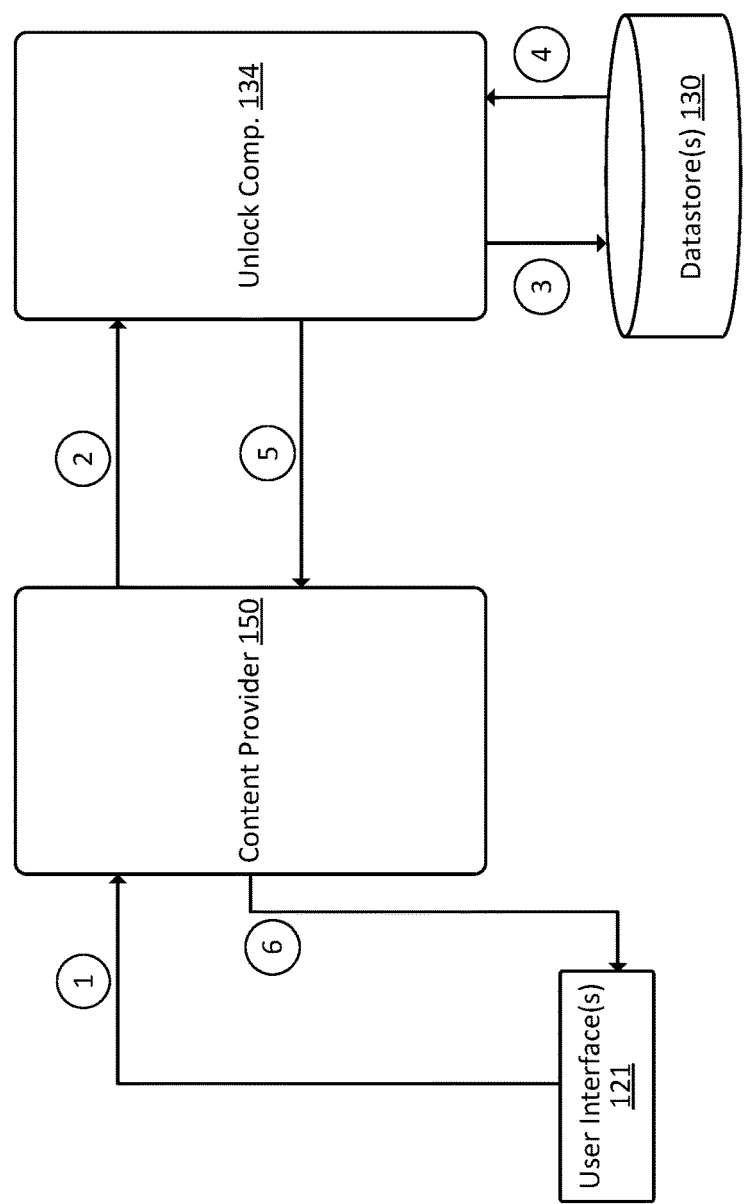
FIG. 3 is an example conceptual diagram showing components of a system utilized for establishing access to content that has been previously enabled, according to an embodiment described herein.

The request may be received at the content provider 150, which may initiate a process for determining whether access has been granted to the content, and if not, what is needed to gain access. FIG. 3, described below, describes a process when access has already been granted. Based at least in part on a determination that access to the content has not previously been granted, the content provider 150 may send, at step 2, an authorization request to the payment service. The authorization request may include an indication of the user request to access the access-restricted content as well as identifying information, such as information associated with the user device 102, the payment application, or a user account associated with the user, or context of the transaction (peer-to-peer transaction, transaction to purchase stocks, transaction to gift cryptocurrency, etc.). In some examples, the authorization request can include an identifier of the content (e.g., for identifying the content), a publisher, content provider, or other merchant identifier (e.g., for identifying the source of the content), an indication of a condition to be satisfied (e.g., a cost associated with a payment to be made) to access the content, or the like.

In examples, the content provider 150 have pre-registered for the services provided by the payment service 104, either through the payment service 104 or by generation of the platforms described herein. In other examples, instead of registration, the payment application 122 may be detected on the user device 102 and that detection may result in the content application authenticating itself with the payment application, either before receiving the content access request or in response to the request to access the digital content. As such, the content application 120 can send the authorization request to the payment service 104 via the content provider 150. In yet an additional example, a user can select to pay for access to the content using the payment service 104, in which case, the content provider 150 can send the authorization request to the payment service 104. In examples where the payment application 122 is not already installed on the user device 102, the content provider 150 can send the authorization request to the payment service 104, which can cause the payment application 122 to be downloaded on the user device 102. In this example, a recommendation to download the payment application 122 may be presented and, once downloaded, the payment application 122 may be used to enable digital content access as described herein. In some examples, if the user does not have an account, downloading the payment application 122 can trigger an onboarding flow for creating a new user account for the user. In yet another example, instead of the user, a contact of the user (established, for example by determining contacts of the user one the payment server of via third party integrations through social network connections) may have a pre-existing registration and the user can leverage the contact's registration. In one implementation, a request may be sent to the contact for authorizing access (not shown).

The unlock component 134 may receive the authorization request and initiate a process of determining whether to withdraw funds from the user account to satisfy payment for access to the content, or whether access has already been granted and an indication of such authorization should be sent to the content provider 150. Access to the digital content can take various forms. For example, access may be automatically enabled and payment automatically made utilizing the payment application 122, for example, when user preferences authorize doing so. In other examples, an interactive element as described in more detail herein may be displayed and interacted with by the user, which may enable the payment application 122 to be used for payment of the content access. In still other examples, interaction with an interactive element may cause the payment application 122 to execute in the foreground of the user device 102 such that a user may provide user input to the payment application 122 to complete payment for content access, or send the request to another user for purchase (e.g., a teen may send the request to a parent device for authorization, or a friend may send the request to another asking for a gift of subscription access). In still other examples, access may be granted when the content is associated with one or more characteristics, such as subject matter, content publisher, etc. or the request satisfies one or more rules. The rule(s) may be set by user preferences or the payment service 104, or may be set, or determined, based on machine learning results, recommendation interaction by the user, etc. In examples, determining the subject matter, or other characteristics, of the digital content may be based on metadata associated with the digital content or analysis of the content, such as word-based analysis, image analysis, audio-based analysis, etc.

In examples, the unlock component 134 may query the datastore 130 with account data for the user account. The account data may include a host of information, but may include one or more user preferences associated with content access, as described above. The user preferences may take any form and may include any preference, but for example the user preferences may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain publishers, certain content types, certain monetary amounts, certain periods of time that the rules are to be in force, rules associated with certain platforms, etc. By so doing, the user or the payment service may configure the user preferences to tailor the user experience for granting access to access-restricted content.

In a situation where the user preferences indicate that access to the requested content may be enabled automatically without additional user input. In this example, the unlock component 134 may send, at step 3, the authorization request to the payment component 136 configured to facilitate withdrawal of funds from the user account. Based at least in part on a determination (e.g., based on user preferences or the like) that user confirmation should be provided before funds are withdrawn, the payment component 136 may send, at step 4, a code (e.g., QR code, barcode, etc.), link (e.g., deep link, hyperlink, etc.), or other interactive element to the unlock component 134. The unlock component 134 may then send, at step 5, the interactive element to the content provider 150 to cause display of the interactive element on the user device 102, which may be within the user interface where the user input requesting content access was received. In some examples, the interactive element can be sent to the user device via a text message, email, push notification, in-app notification or the like.

The user may interact, via the user interface 121, at step 6, with the code, link, or interactive element to confirm that fund withdrawal is authorized. In examples, interaction with the code, link, or interactive element may be based on the form of the code, the link, or the interactive element. For example, a code can be scanned, a link can be actuated (e.g., clicked), a digital button can be actuated (e.g., "pressed," etc.), etc. In some examples, the interaction at step 6 can be provided via another interface, such as a speech user interface.

When the interactive element is selected, the payment application 122 on the user device 102 may, at step 7, initiate payment for access to the content. To initiate payment, the payment application 122 may send, at step 8, a payment authorization request to the unlock component 134. The unlock component 134 may then send, at step 9, an access token request or other access credentials to the payment component 136 indicating the user has confirmed that withdrawal of funds should be made to pay for the content access. The payment component 136 may, at step 10, generate and send the requested access token or other access credentials back to the unlock component 134, which may utilize the access token to secure payment for content access. For example, a payment request that includes the access token may be sent, at step 11, to the payment component 136, which may confirm that the access token is authentic and may, at step 12, withdraw the funds for granting access to the access-restricted content. Withdrawal of the funds may be performed by withdrawing funds from a user stored balance and depositing the funds in a stored balance account of the payment service 104, and then transferring the funds from the stored balance account of the payment service 104 to an account of the content provider (which may be an account associated with the payment service 104 as stored in association with the content provider or an external account). The funds may be deposited or otherwise associated with an account of the content provider 150. The unlock component 134 may receive an indication that the withdrawal has occurred and may send, at step 13, a response to the content provider 150 indicating that access to the requested content should be granted. The content provider 150 may utilize the response to grant access, at step 14, to the requested content and may cause the user device 102 to display the requested content, via the user interface 121, for viewing by the user.

In some examples, the content provider 150 can be accessed via a content application 120, which can be running in a foreground of a user device 102. In some examples, the payment service 104 can be accessible via an integration with the content service, regardless of whether a payment application 122 is installed on a user device 102, or via the payment application 122 running in the background of the user device 102. In some examples, the payment application 122 can transition to the foreground to facilitate payment operations as described herein. In some examples, the payment application 122 can remain in the background and facilitate payment operations as described herein. Further, it should be understood that the various techniques for enabling access to access-restricted content as described herein, as well as combinations of those techniques can be performed at different times and that examples of such are provided by way of example in FIGS. 4-6.

FIG. 3 is an example conceptual diagram showing components of a system utilized for establishing access to content that has been previously enabled, according to an embodiment described herein. FIG. 3 may also include some of the same components as described with respect to FIG. 1. For example, the environment 300 may include an unlock component 134. The environment 300 may also include a content provider 150 and one or more datastores 130. Example operations performed by the various components in the environment 300 is provided below by way of steps 1-6, however it should be understood that fewer or more steps may be involved and the steps need not be performed in the order described by way of example below.

For example, once access has been granted to specific content or content associated with a specific content provider or publisher, the payment service may be utilized to allow for continued or subsequent access to the content. For example, the user, at step 1, may provide input, via a user interface 121, requesting subsequent viewing of the content, such as on the same user device 102 that the content was viewed on originally or a different device associated with the same user account. The content provider 150 may, at step 2, receive the request and may send the authorization request to the unlock component 134. It should be understood that the subsequent request for access the content may be received in association with a different user device, a different content publisher, a different content platform, etc., but that an identifier of the user (such as an account identifier) may be utilized to determine whether access has already been granted for the digital content at issue. Additionally, while in some examples the request may be received from a content application 120, it should be understood that at least one of the initial request or the subsequent request may be received from the payment application 122 itself.

The unlock component 134 may, at step 3, query the datastore 130 to determine whether access has already been granted for the content at issue. For example, the access token or other credentials that were utilized to enable access to the content originally may be stored and queried for subsequent use. In other examples, the datastore 130 may store indications of content that is accessible to the user account and utilize that data to determine whether the content in question has already been enabled for viewing in association with the user account. For example, an identifier of the user account or other identifier associated with the user may be stored in association with identifiers of enabled content, and those identifiers of the enabled content may be identified and used to determine if given content already has been enabled for access. At step 4, the datastore 130 may return data indicating that access has already been granted to the content at issue. Having determined that access to the content has already been enabled, the unlock component 134 may, at step 5, send an authorization response to the content provider 150, which may utilize the response to cause the content to be displayed for the user. For example, at step 6, the content provider 150 may provide the content data corresponding to the content to the user device 102 in a way that causes presentation of the content on the user device 102. It should be noted that subsequent access to the content need not be on the same user device that originally viewed the content, nor does the access need to be from the same publisher or content provider or application utilized to access content. Instead, the access token generated when access is originally enabled may be utilized regardless of the platform being utilized to access the content.

Figure 4:
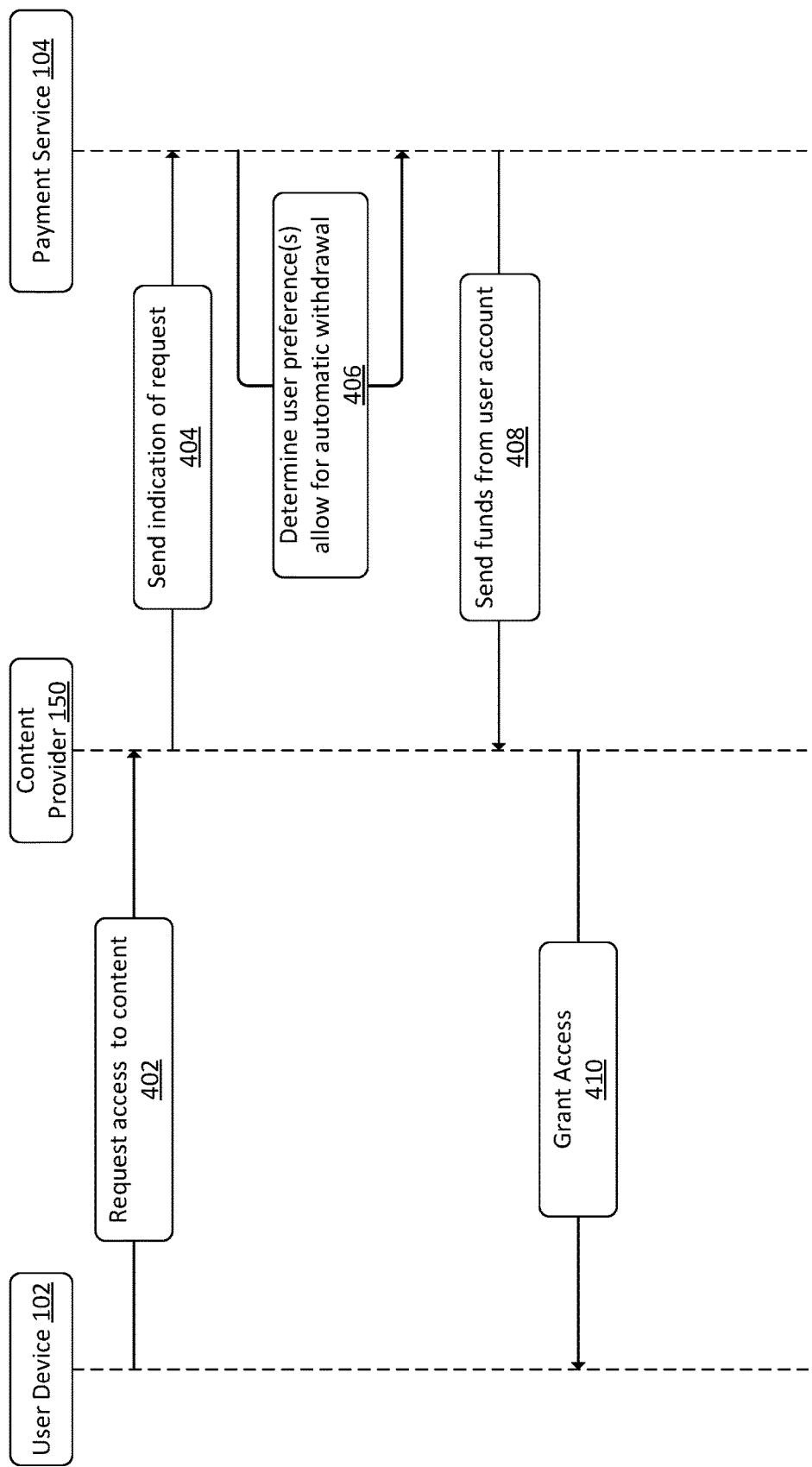
FIG. 4 is a sequence diagram showing an example process for integration of platforms for multi-platform content access, specifically where a user preference indicates that content access should be performed automatically and without user input, according to an embodiment described herein.

FIG. 4 is a sequence diagram showing an example process for integration of platforms for multi-platform content access, specifically where a user preference indicates that content access should be performed automatically and without user input, according to an embodiment described herein. The processes described with respect to FIG. 4 are presented sequentially from blocks 402-410. However, it should be understood that the processes need not be performed in the order represented in FIG. 4 and that at least some of the processes may be performed in parallel with other processes.

At block 402, a user device 102 may send a request to access content to a content provider 150. For example, a user may provide user input to an application or other user interface (e.g., the user may provide input to a web browser, application, part of an application, etc.) indicating a request to access content that is access-restricted. In some examples, the request is made using an application of the content provider 150. In other examples, the request is made using an application or user interface that is not specifically associated with the content provider 150 or the payment service 104, such as when the application is a web browser. In still other examples, the request is made using the payment application associated with the payment service 104.

At block 404, the content provider 150 may send an indication of the request to a payment service 104. For example, the request may be received at the content provider 150, which may initiate a process for determining whether access has been granted to the content, and if not, what is needed to gain access. The authorization request may include an indication of the user request to access the access-restricted content as well as identifying information, such as information associated with the user device 102, the payment application, or a user account associated with the user.

At block 406, the payment service 104 may determine that one or more user preferences associated with a user account of the user indicates that automatic withdrawal of funds is permitted to grant access to content. For example, the payment service 104 may query the datastore 130 with account data for the user account. As described above, the account data may include a host of information, including one or more user preferences associated with content access. The user preferences may take any form and may include any preference, but for example the user preferences may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain publishers, certain content types, certain subject matters, certain monetary amounts, certain periods of time that the rules are to be in force, rules associated with certain platforms, etc. The user preferences may also indicate which subscriptions are active for the user account. As such, utilizing at least the user preferences described above, the payment service may determine whether one or more conditions for automatic withdrawal are satisfied. The conditions may be those indicated by the user preferences, as well as other conditions such as withdrawal guardrails, timing constraints, device constraints, etc. As such, the user or the payment service may configure the user preferences to tailor the user experience for granting access to access-restricted content.

Figure 5:
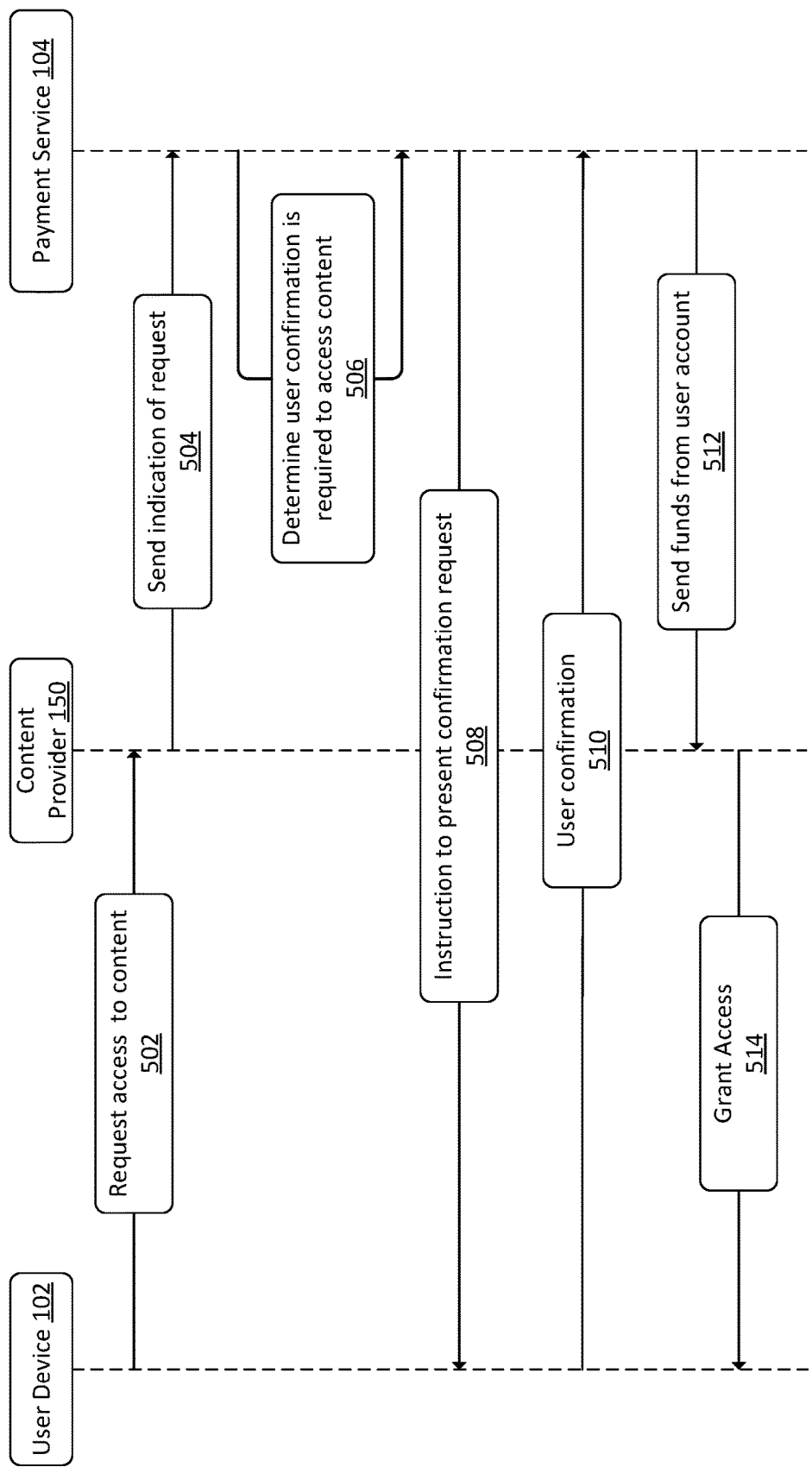
FIG. 5 is a sequence diagram showing an example process for integration of platforms for multi-platform content access, specifically where a user preference indicates that content access should be performed after receiving user confirmation, according to an embodiment described herein.
Figure 6:
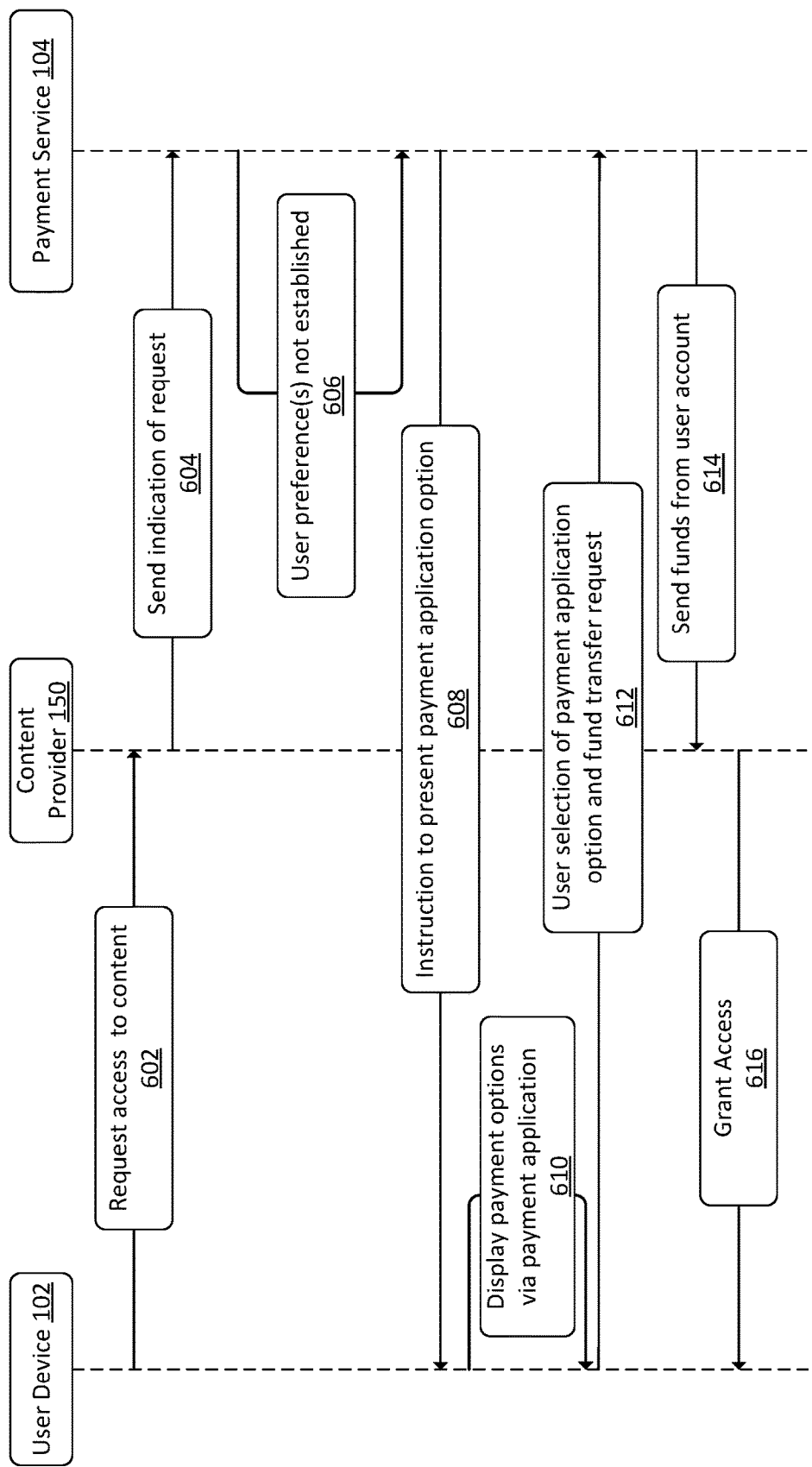
FIG. 6 is a sequence diagram showing an example process for integration of platforms for multi-platform content access, specifically where user preferences on content access have not been set up or otherwise indicate that user interaction is required, according to an embodiment described herein.

In the example of FIG. 4, the user preferences indicate that automatic withdrawal of funds to enable access to access-restricted content is authorized for at least content of the type or having a characteristic associated with the requested content. That is, the payment service 104 can determine that the content satisfies a condition, is associated with a particular characteristic, or is otherwise associated with a user preference that enables automatic withdrawal of funds. In this example, some of the processes described in FIGS. 5 and 6 are not performed, such as processes associated with generation and sending of interactive elements, display of options for using the payment application to facilitate fund withdrawal, or requesting user confirmation. As such, techniques described in FIG. 4 enable a "frictionless" process for enabling access to access-restricted content. In some examples, to facilitate such "frictionless" operations, the payment service 104 and the content provider 150 can maintain an active authentication session.

At block 408, the payment service 104 may send funds from a stored balance account of the user account to the content provider 150 or an account associated with the content provider 150. For example, the payment service 104 may then send an access token request or other access credentials to a payment component indicating withdrawal of funds should be made to pay for the content access. The payment component may withdraw the funds for granting access to the access-restricted content. The funds may be deposited or otherwise associated with an account of the content provider 150.

At block 410, the content provider 150 may grant access to the requested content based at least in part on the withdrawal of funds from the user account to the account of the content provider 150. For example, the content provider 150 may be provided with an access token or other secure credentials indicating that, in response to the authorization request, funds have been withdrawn from the user account or funds have been deposited in the account of the content provider 150, where deposit of the funds may be on a per-access request or in bulk (e.g., batched). This may cause the content provider 150 to grant access to the requested content and cause the user device 102 to present the requested content.

FIG. 5 is a sequence diagram showing an example process for integration of platforms for multi-platform content access, specifically where a user preference indicates that content access should be performed after receiving user confirmation, according to an embodiment described herein. The processes described with respect to FIG. 5 are presented sequentially from blocks 502-514. However, it should be understood that the processes need not be performed in the order represented in FIG. 5 and that at least some of the processes may be performed in parallel with other processes.

At block 502, a user device 102 may send a request to access content to a content provider 150. For example, a user may provide user input to an application or other user interface (e.g., the user may provide input to a web browser, application, part of an application, etc.) indicating a request to access content that is access-restricted. In some examples, the request is made using an application of the content provider 150. In other examples, the request is made using an application or user interface that is not specifically associated with the content provider 150 or the payment service 104, such as when the application is a web browser. In still other examples, the request is made using the payment application 122 associated with the payment service 104.

At block 504, the content provider 150 may send an indication of the request to a payment service 104. For example, the request may be received at the content provider 150, which may initiate a process for determining whether access has been previously granted to the content, and if not, what is needed to gain access. When the request is received, the content provider 150 may send an authorization request to the payment service 104 associated with the payment application 122. To do so, the content provider 150 may have pre-registered for the services provided by the payment service 104, either through the payment service 104 or by generation of the platforms described herein. In other examples, instead of registration, the payment application 122 may be detected on the user device 102 and that detection may result in the content application 120 authenticating itself with the payment application 122, either before receiving the content access request or in response to the request to access the digital content. As such, the content application 120 can send the authorization request to the payment service 104 via the content provider 150. In yet an additional example, a user can select to pay for access to the content using the payment service 104, in which case, the content provider 150 can send the authorization request to the payment service 104.

At block 506, the payment service 104 may determine user confirmation is required to access the content. For example, the payment service 104 may determine that one or more user preferences associated with a user account of the user indicates that user confirmation should be requested before withdrawing funds to grant access to content or that a condition has not been satisfied and thus confirmation should be requested before withdrawing funds. For example, and as described above, the payment service 104 may query the datastore 130 with account data for the user account. The account data may include a host of information, including one or more user preferences associated with content access. The user preferences may take any form and may include any preference, but for example the user preferences may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain publishers, certain content types, certain subject matters, certain monetary amounts, certain periods of time that the rules are to be in force, rules associated with certain platforms, etc.

In the example of FIG. 5, the user preferences indicate that the user has authorized withdrawal of funds to enable access to access-restricted content after confirming that the funds should be withdrawn. For example, the user preferences may indicate that a user interface be presented on the user device 102 requesting confirmation of fund withdrawal for content access, and that the user provide such confirmation, before funds are withdrawn.

In some examples, confirmation may be requested based on a determination of whether a condition has been satisfied. In some examples, the condition can be tied to a user preference. In some examples, the condition can be tied to a security setting or the like. In some examples, the condition can be tied to a payment service preference or rule for accessing content. In at least one example, based at least in part on a determination that a condition has not been satisfied, a request for confirmation can be sent to the user device 102.

At block 508, the payment service 104 may send an instruction to the user device 102 (either directly or through the content provider 150) to present a confirmation request on the user device 102. The confirmation request may include details of transaction at issue, such as the content provider 150 that is involved, the content publisher, the content title or other identifier, the user preference being applied, or the monetary amount to be withdrawn. In some examples, the confirmation request can be presented within a content application 120 associated with the content provider 150 or via a text message, email, push notification, or other in-app notification (e.g., in the payment application 122).

At block 510, the user device 102 may send the user confirmation to the payment service 104 (again, directly or through the content provider 150). The user confirmation may be in the form of user input data indicating that the user has selected an interactive element indicating a desire to have the funds withdrawn to gain access to the requested content. In other examples, the user input data may take other forms, such as voice input, gesture input, or other tactile input that is not strictly selection of an interactive element.

At block 512, the payment service 104 may send funds from the user account to the content provider 150 or an account associated with the content provider 150. For example, the payment service 104 may then send an access token request or other access credentials to a payment component indicating withdrawal of funds should be made to pay for the content access. The payment component may withdraw the funds for granting access to the access-restricted content. The funds may be deposited or otherwise associated with an account of the content provider 150.

At block 514, the content provider 150 may grant access to the requested content based at least in part on the withdrawal of funds from the user account to the account of the content provider 150. For example, the content provider 150 may be provided with an access token or other secure credentials indicating that, in response to the authorization request, funds have been withdrawn from the user account or funds have been deposited in the account of the content provider 150. This may cause the content provider 150 to grant access to the requested content and cause the user device 102 to present the requested content.

While FIG. 5 may not offer the same "frictionless" content access as the process described above with reference to FIG. 4, the process described in FIG. 5 offers technical advantages by reducing the amount of friction required for accessing the content. In FIG. 5, the user need only confirm payment and need not provide further input to access the content requested.

FIG. 6 is a sequence diagram showing an example process for integration of platforms for multi-platform content access, specifically where user preferences on content access have not been set up or otherwise indicate that user interaction is required, according to an embodiment described herein. The processes described with respect to FIG. 6 are presented sequentially from blocks 602-616. However, it should be understood that the processes need not be performed in the order represented in FIG. 6 and that at least some of the processes may be performed in parallel with other processes.

At block 602, a user device 102 may send a request to access content to a content provider 150. For example, a user may provide user input to an application or other user interface (e.g., the user may provide input to a web browser, application, part of an application, etc.) indicating a request to access content that is access-restricted. In some examples, the request is made using an application of the content provider 150. In other examples, the request is made using an application or user interface that is not specifically associated with the content provider 150 or the payment service 104, such as when the application is a web browser. In still other examples, the request is made using the payment application associated with the payment service 104.

At block 604, the content provider 150 may send an indication of the request to a payment service 104. For example, the request may be received at the content provider 150, which may initiate a process for determining whether access has been previously granted to the content, and if not, what is needed to gain access. When the request is received, the content provider 150 may send an authorization request to the payment service 104 associated with the payment application 122. To do so, the content provider 150 may have pre-registered for the services provided by the payment service 104, either through the payment service 104 or by generation of the platforms described herein. In other examples, instead of registration, the payment application 122 may be detected on the user device 102 and that detection may result in the content application 120 authenticating itself with the payment application 122, either before receiving the content access request or in response to the request to access the digital content. As such, the content application 120 can send the authorization request to the payment service 104 via the content provider 150. In yet an additional example, a user can select to pay for access to the content using the payment service 104, in which case, the content provider 150 can send the authorization request to the payment service 104.

At block 606, the payment service 104 may determine that one or more user preferences associated with a user account of the user have not been established or otherwise indicate that automated withdrawal of funds (whether with user confirmation or not) has not been granted. For example, the payment service 104 may query a datastore with account data for the user account. The account data may include a host of information, but may specifically include one or more user preferences associated with content access. The user preferences may take any form and may include any preference, but for example the user preferences may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain publishers, certain content types, certain monetary amounts, certain periods of time that the rules are to be in force, rules associated with certain platforms, etc. By so doing, the user or the payment service may configure the user preferences to tailor the user experience for granting access to access-restricted content.

In the example of FIG. 6, the user preferences are not established or otherwise indicate that the user has not authorized automatic withdrawal of funds.

At block 608, the payment service 104 may send an instruction to the user device 102 (directly or through the content provider 150) to present an option to pay for content access utilizing the payment application of the user device 102. For example, the payment application may be downloaded on the user device 102, and when the user sees a paywall for the content, the paywall may include options for making payment. One of those options may be to use the payment service 104, via the payment application 122, to make payment. In another example, a pop-up, overlay, or other user interface element can be presented within the content application 120 to initiate payment via the payment application 122.

At block 610, the user device 102 may display the payment options via the payment application. In an example, based at least in part on a determination that the user selects the option to pay using the payment service, the payment application 122 may begin running in a foreground of the user device 102 and may display the payment options. That is, the payment application 122 can transition from the background to the foreground and can enable the user to configure payment. For example, the user may have deposited a certain amount of money in association with the payment application, the user may have a payment instrument such as a credit card associated with the payment application, or the user may have cryptocurrency or other forms of currency associated with the payment application. Any one of the user accounts or balances can be used for payment for access to the content. The user may select an option for payment, which may trigger the payment application to initiate a transaction for payment to the content provider 150 for content access.

At block 612, the user device 102 may send an indication of the user selection of the payment application option and a fund transfer request to the payment service 104. For example, secure tokens or other encrypted data may be sent to the payment service 104 to cause the payment service 104 to determine the amount of funds to be withdrawn, the user account from which the funds should be withdrawn, and the account of the content provider 150 to which the funds should be deposited.

At block 614, the payment service 104 may send funds from the user account to the content provider 150 or an account associated with the content provider 150. For example, the payment service 104 may then send an access token request or other access credentials to a payment component indicating withdrawal of funds should be made to pay for the content access. The payment component may withdraw the funds for granting access to the access-restricted content. The funds may be deposited or otherwise associated with an account of the content provider 150.

At block 616, the content provider 150 may grant access to the requested content based at least in part on the withdrawal of funds from the user account to the account of the content provider 150. For example, the content provider 150 may be provided with an access token or other secure credentials indicating that, in response to the authorization request, funds have been withdrawn from the user account or funds have been deposited in the account of the content provider 150. This may cause the content provider 150 to grant access to the requested content and cause the user device 102 to present the requested content.

Figure 7:
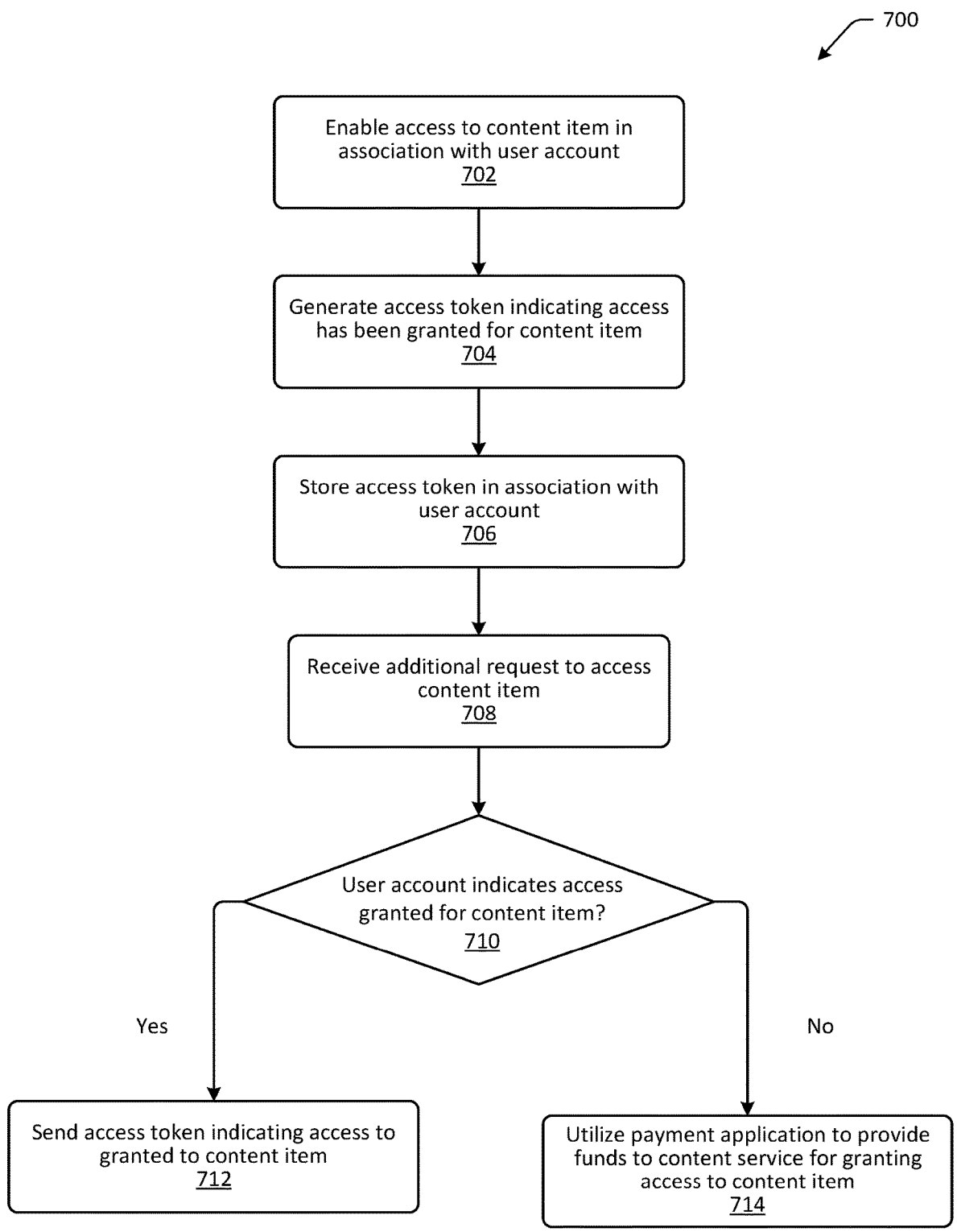
FIG. 7 is a flow diagram of an example process for providing subsequent access to content that has been previously enabled pursuant to the present disclosure, according to an embodiment described herein.

FIG. 7 is an example process for integration of platforms for multi-platform content access. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 8-16, although the processes may be implemented in a wide variety of other environments, architectures and systems.

FIG. 7 is a flow diagram of an example process 700 for providing subsequent access to content that has been previously enabled pursuant to the present disclosure, according to an embodiment described herein. The order in which the operations or steps are described is not intended to be construed as a limitation, and any number of the described operations may be combined in any order and/or in parallel to implement process 700.

At block 702, the process 700 may include enabling access to a content item in association with a user account. Enabling the access may be performed by the payment service or the content provider as described herein. For example, enabling access may be performed as described with respect to FIGS. 2 and 4-6, above.

At block 704, the process 700 may include generating an access token indicating access has been granted for the content item. In some examples, the access token can be generated by the payment service 104. In some examples, the access token can be generated by the content provider 150. The access token may by encrypted data that indicates at least one of the content item at issue, the user account associated with the user device, an identifier of the user device, an identifier of the content provider, an identifier of the content publisher, or access qualification associated with the content such as an amount of time that access is granted, a number of devices that access is granted on, etc.

At block 706, the process 700 may include storing the access token in association with the user account of the user. For example, the access token may be stored in a datastore indicating account details specific to the user or the user device. In other examples, the access token may be stored in a datastore of other access tokens. In this example, the access token may be associated with an identifier of the user account such that the identifier of the user account may be utilized to query the datastore for the access token.

At block 708, the process 700 may include receiving an additional request to access the content item. In some examples, the request can be received by the content provider via a content application. In some examples, the request can be received by the content provider via the payment application (and, payment service). In an example, the user may request to view the content again on the same user device and via the same content provider. In other examples, the method of requesting content access may differ from the original request in one or more ways. For example, a different user device may be used, a different application, a different content provider may be used, a different content platform may be used, a different publisher may be used, a different application may be used, etc. Typically, in conventional technologies, these changes would require the user to provide some user input to associate the original request and granted access with the new request. However, as described herein, the payment application may be agnostic of the differences and may utilize the described techniques to gain subsequent access to the content regardless of the changes.

At block 710, the process 700 may include determining whether the user account associated with the additional request indicates access is granted to the content item. For example, the datastore may be queried to determine if an access token associated with the content item is present. An identifier of the user account associated with the additional request may be used to query the datastore to determine if the access token is present. For example, the identifier of the user account may be stored in association with identifiers of enabled content, and the identifier of the user account may be utilized to determine what content identifiers are associated therewith. If a content identifier as stored matches, or otherwise corresponds to, a content identifier of the requested content, it may be determined that access is granted to the content item.

In examples where the user account indicates access has been granted, the process 700 may include, at block 712, sending the access token indicating access has been granted to the content item. The access token may be sent to the content provider from which the request was received or to the user device. The access token may be utilized by the content provider to grant access to the content item without requesting additional user input from the user.

In examples where the user account does not indicate that access has been granted, the process 700 may include, at block 714, utilizing the payment application to provide funds to the content provider for granting access to the content item. For example, the processes described with respect to block 702 may be performed.

Figure 8:
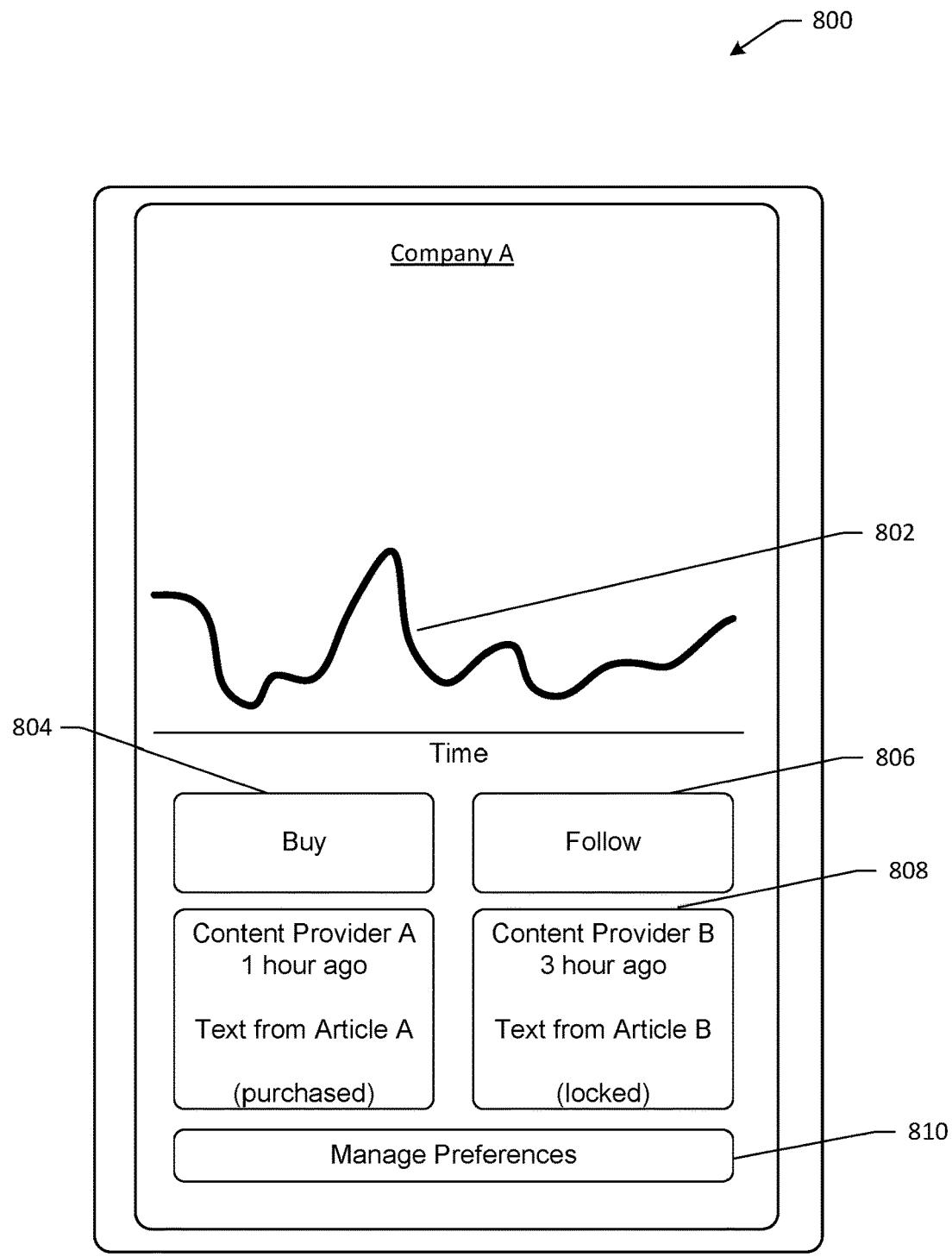
FIG. 8 is an example user interface displayed on an example user device, where the user interface is configured to surface content in association with a payment application, according to an embodiment described herein.

FIG. 8 is an example user interface 800 displayed on an example user device, where the user interface is configured to surface content in association with a payment application, according to an embodiment described herein. For example, the payment application described with respect to FIG. 8 may be the same or similar to the payment application 122 described with respect to FIG. 1.

In the example of FIG. 8, a user may utilize the payment application to select functionality for viewing content. In other examples, the user may be utilizing the payment application for one or more other purposes other than viewing content, but the payment application may still surface the content. For example, the user may be viewing investment information associated with the user account, the user may be utilizing cryptocurrency-related functionality, the user may be engaged in making a payment or accepting a payment, or the user may be engaged in applying for or managing a payment instrument stored on the payment application. In these and other examples, the payment service as described herein may include a content component 140 that may be configured to determine content to surface to the user. In some examples, as described above, such a determination can be based at least in part on context data indicating operations being performed by the user. For example, the context data may indicate a location of the user device 102, content being viewed currently on the user device 102, a portion of the payment application 122 being utilized, content accessed by similar users, content accessed by users in the user's contact list, content recommended by people the user follows, etc. By way of example, the user may be utilizing the payment application 122 to view investment information 802 about a given company. This context data may be utilized to surface digital content about the stock, about the given company, about the stock market in question, etc. Relevance of the digital content may be based at least in part on keywords determined to be illustrative of the digital content, such as by semantic analysis techniques (e.g., term frequency inverse document frequency processes) or natural language processing. In some examples, a word-based analysis, image-based analysis, audio-based analysis can be used to identify the keywords. In some examples, one or models, such as machine-learning models, can be used to determine relevance or similarity between content and operations being performed or to be performed by the user.

The user interface shown in FIG. 8 may also include a buy element 804 and a follow element 806. The buy element 804 may be used to receive user input on a request to purchase stocks, cryptocurrency, etc. associated with the displayed investment information 802. The follow element 806 may be used to receive user input on creating associations between the user and the entity associated with the investment information 802, for example, in association with a content provider. Additionally, one or more content indicators 808 may be displayed for recommended content to be view by the user. The content indicator(s) 808 may include a name of the content publisher, a title of the content or otherwise an identifier of the content, as well as an indicator of whether the content is access restricted or otherwise requires payment before being accessible, and when access-restricted a monetary indicator of what payment is required to access the content, for example. In some examples, the content indicators can indicate whether content is accessible (e.g., access has been granted) or if content is available (e.g., access has not yet been granted) such that the user can access content relevant to the information they are viewing via the user interface. As shown in FIG. 8, the content may be already available to the user, such as in situations where the content has already been purchased, subscribed to, etc. In other examples the content may be access restricted, and in these examples an indication that the content is "locked" or otherwise requires purchase may be presented.

In some examples, the content indicators 808 may be presented in a ranked order, with the indicators associated with a portion of the content items that are or are not already access enabled being ranked more favorably than other ones of the content items. That is, content items that are not enabled may be presented prior to other content items, may be presented with a different user interface design than other content items, or may otherwise be conspicuously presented via the user interface based at least in part on being ranked more favorably than the other content items. In some examples, content items that are enabled may instead be presented prior to other content items, may be presented with a different user interface design than other content items, or may otherwise be conspicuously presented via the user interface based on a more favorable ranking. In some examples, such ranking can additionally or alternatively be based on relevance to the subject matter of the user interface or other context data (e.g., date, time, holiday, event, or the like). It should be understood that the content indicators 808 may be presented by acquiring text from a source of the text and adding that text to at least a portion of the content indicators 808 as a summary or as an exact copy of the text from the source. In other examples, the content indicators 808 may be an excerpt of the content in question with the formatting and look of the content from the content source. In these examples, when a user provides input to the content indicators 808, a different page, window, interstitial of the payment application or other user interface may be displayed such that the user can view the content without leaving the page in question, or the user may select the content indicators 808 and the content application may be caused to be displayed to view the content, and when the user is done viewing the content the payment application may be caused to be displayed again.

To access the access-restricted content from the payment application, the user may select the content and depending on the user preferences associated with user account, the payment application and payment service may automatically withdraw the funds to pay for access and enable content access, or may request the user to confirm the withdrawal before proceeding, as described above. Once access to the content is enabled, the user interface may be updated such that the indicator of access-restriction is removed as well as the indicator of monetary amount needed. In these examples, selection of the content may cause the content to be displayed, whether in the payment application or another application configured to display the content.

The user interface may also include a "manage preferences option" 810 or otherwise to provide user input on preferences for accessing access-restricted content, as described herein. For example, the user may utilize this functionality to display the user interface described with respect to FIG. 9, described below.

Figure 9:
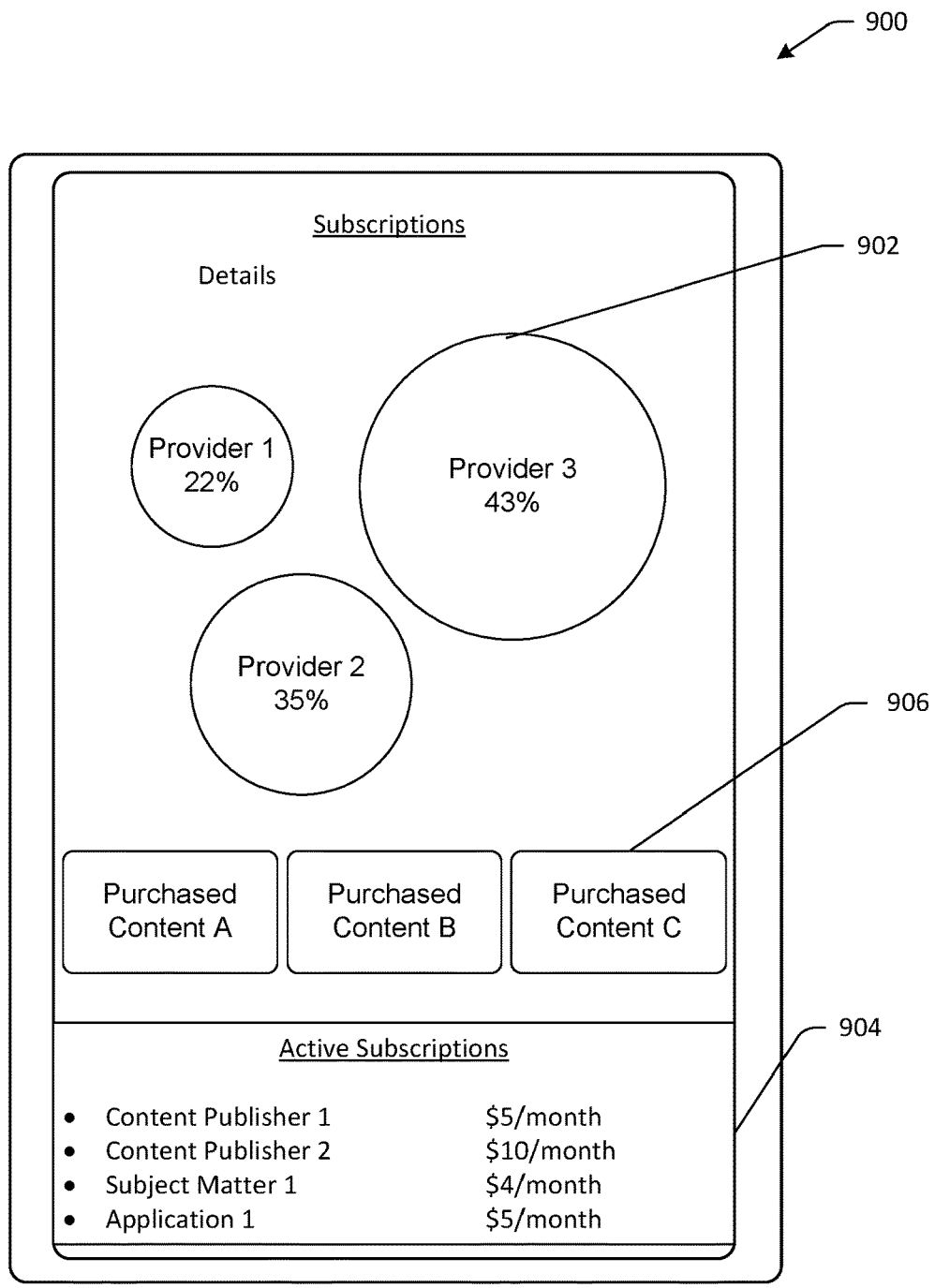
FIG. 9 is an example user interface displayed on an example user device, where the user interface is configured to manage preferences for content access in association with a payment application, according to an embodiment described herein.

FIG. 9 is an example user interface 900 displayed on an example user device, where the user interface is configured to manage preferences for content access in association with a payment application, according to an embodiment described herein. For example, the payment application described with respect to FIG. 9 may be the same or similar to the payment application 122 described with respect to FIG. 1.

In some examples, content can be surfaced to users of the payment service in context, as described above with reference to FIG. 8, or via a content gallery. In some examples, the content gallery can be a user interface from which users can access purchased content, manage subscriptions, or otherwise interact with content. In the example of FIG. 9, a user may select functionality for managing content subscriptions as described herein. The user interface for managing content subscriptions may include content indicators 902, which can summarize or otherwise provide information about content associated with the user. In FIG. 9, the content indicators 902 represent a breakdown of content purchased by the user. In examples, user preferences may also be displayed. The user preferences that have been set include indications of the authorized content type(s), indications of the authorization type, and monetary limits that have been set. It should be understood that while the content indicators 902 shown in FIG. 9 are for content publishers, the content indicators 902 may be associated with content providers, content types, content subject matters, etc.

Additionally, the user interface may include indicators of "active subscriptions" 904 or otherwise an indication of what content access has already been purchased and is otherwise "active." The active subscriptions may include content publisher indicators, subject matter indicators, application indicators, and amounts associated therewith. This view of active subscriptions may provide a user with an on-the-fly presentation of what user preferences have been established for the user account, such as which content publishers have been selected, which subject matter has been selected, and how much the payment application has been authorized to withdraw for each.

Additionally, a gallery 906 of purchased or otherwise access enabled content may be displayed on the user interface. The gallery 906 may show content that has been purchased, and that content may be displayed based on one or more rules, such when content was accessed, when content was enabled for access, recency or frequency of access, subject matter being presented on the user interface, subscriptions associated with the user account, etc.

Figure 10:
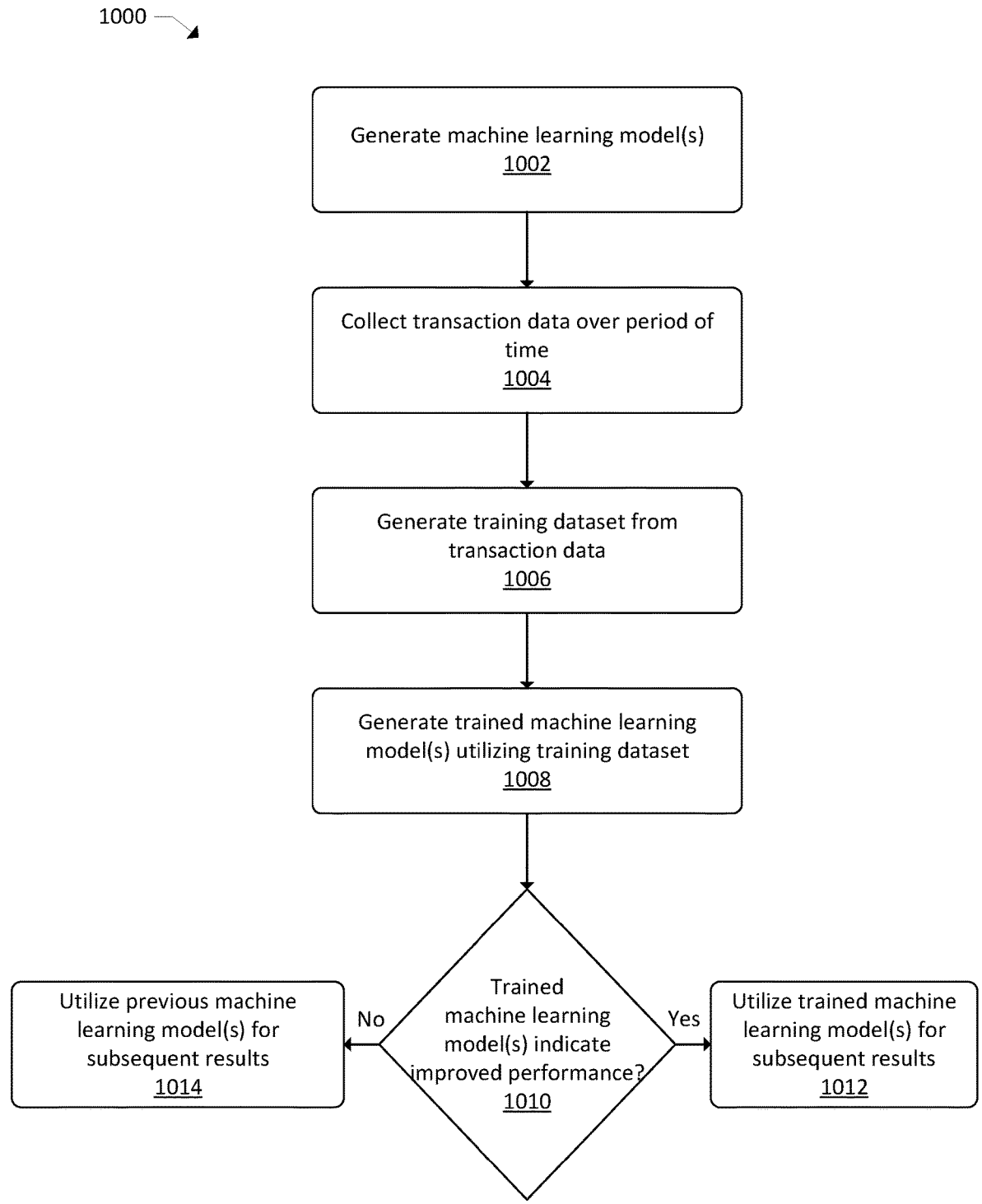
FIG. 10 is a flow diagram of an example process for training and utilizing machine learning models in association with integration of platforms for multi-platform content access, according to an embodiment described herein.
Figure 11:
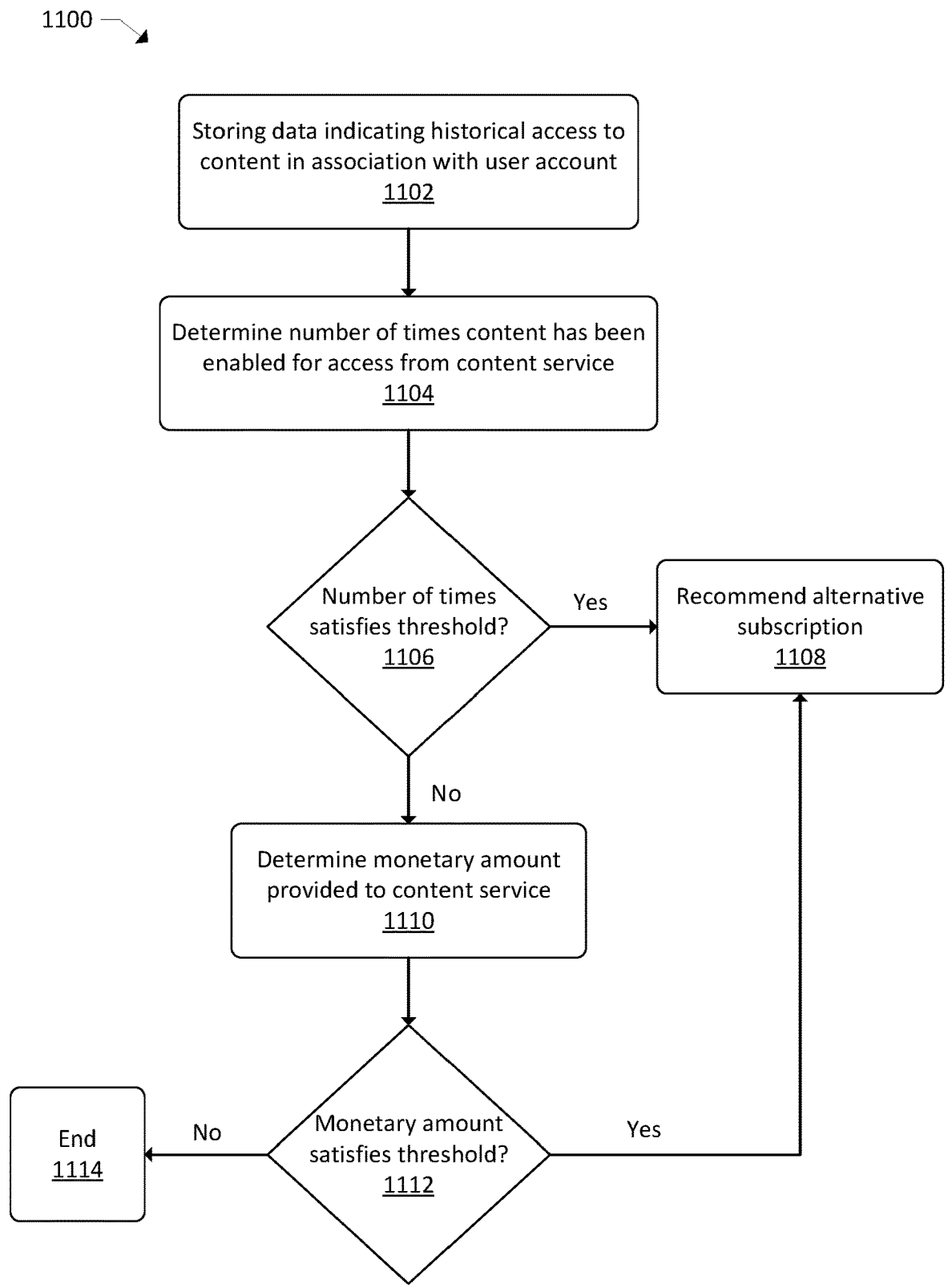
FIG. 11 is a flow diagram of an example process for generating one or more recommendations associated with content access across platforms, according to an embodiment described herein.

FIGS. 10 and 11 illustrates processes for integration of platforms for multi-platform content access. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-9 and 12-16, although the processes may be implemented in a wide variety of other environments, architectures and systems.

FIG. 10 is a flow diagram of an example process 1000 for training and utilizing machine learning models in association with integration of platforms for multi-platform content access, according to an embodiment described herein. The order in which the operations or steps are described is not intended to be construed as a limitation, and any number of the described operations may be combined in any order and/or in parallel to implement process 1000.

At block 1002, the process 1000 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1004, the process 1000 may include collecting transaction data over a period of time. The transaction data may include information associated with previous access to access-restricted content, prior amounts paid for access, prior platforms used to access content, prior user devices utilized, etc. This information may include factors associated with the content access, such as timing data, user feedback, interactions with the payment application, interactions with recommendations, etc.

At block 1006, the process 1000 may include generating a training dataset from the transaction data. Generation of the training dataset may include formatting the transaction data into input vectors for the machine learning model to intake, as well as associating the various data with the outcomes of content access and recommendations.

At block 1008, the process 1000 may include generating one or more trained machine learning models utilizing the training dataset. Generation of the trained machine learning models may include updating parameters and/or weightings and/or thresholds utilized by the models to generate recommendations, user preferences, etc. based at least in part on the data from the training dataset.

At block 1010, the process 1000 may include determining whether the trained machine learning models indicate improved performance metrics. For example, a testing group may be generated where the outcomes of the content access processes are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 1000 may include, at block 1012, utilizing the trained machine learning models for generating subsequent results. For example, the trained machine learning models may be utilized to generate recommendations associated with access-restricted content, for determining whether and when to send recommendations, for determining whether a given recommendation is applicable to a given user account, or for other recommendation-based processes. Additionally, the trained machine learning models may be utilized to adjust or recommend adjusting user preferences or condition thresholds as described herein. It should be understood that the trained machine learning models may be utilized in any scenario where models are utilized as described herein.

In examples where the trained machine learning models do not indicate improved performance metrics, the process 1000 may include, at block 1014, utilizing the previous iteration of the machine learning models for generating subsequent results.

FIG. 11 is a flow diagram of an example process 1100 for generating one or more recommendations associated with content access across platforms, according to an embodiment described herein. The order in which the operations or steps are described is not intended to be construed as a limitation, and any number of the described operations may be combined in any order and/or in parallel to implement process 1100.

At block 1102, the process 1100 may include storing data indicating historical access to content in association with a user account. For example, when a user purchases access to content utilizing the techniques described herein, data indicating details of such purchases may be stored. This historical transaction data may be utilized to identify trends in the user's content access. These trends may include, for example, certain subject matter that is frequently accessed, certain content providers frequently used, certain content publishers that are frequently accessed, and amounts paid.

At block 1104, the process 1100 may include determining a number of times content has been enabled for access from a given content provider. For example, when a user pays to access certain content a given number of times or otherwise with a given frequency, this information may be determined and utilized to generate a recommendation that indicates a subscription to a given content provider is advisable.

At block 1106, the process 1100 may include determining whether the number of times satisfies a threshold number of times. For example, the threshold number of times may be based at least in part on a several factors, such as the content at issue, the content provider at issue, the content publisher at issue, the user account, user preferences, etc.

In examples where the number of times satisfies the threshold number of times, the process 1100 may include, at block 1108, recommending an alternative subscription. For example, say a user accesses 20 articles a month from The Journal and the threshold number of times is 15. A recommendation component may utilize this data as well as subscription cost data to determine whether it is advisable to purchase a monthly subscription to The Journal instead of paying per article. The recommendation component may also utilize data indicating subject matter preferences to make this recommendation.

In examples where the number of times does not satisfy the threshold number of times, the process 1100 may include, at block 1110, determining a monetary amount provided to the content provider. For example, say a user spends $20/month on access to content from a given content publisher.

At block 1112, the process 1100 may include determining whether the monetary amount satisfies a threshold monetary amount. Determining the threshold monetary amount may be performed in the same or a similar manner as determining the threshold number of times, as described with respect to block 1106.

In examples where the monetary amount satisfies the threshold monetary amount, the process 100 may continue to block 1108, where an alternative subscription can be recommended. For example, say a user accesses articles from The Journal, each time paying a per-article price of $0.50 for access for a total of $20. A recommendation component may utilize this data as well as subscription cost data to determine whether it is advisable to purchase a monthly subscription to The Journal instead of paying per article, such as when a monthly subscription is less than $20 per month. The recommendation component may also utilize data indicating subject matter preferences to make this recommendation, as described in more detail herein. In some examples, as described above, a recommendation can be "actionable," enabling a user to initiate or complete an action associated with a recommendation via interaction therewith.

In examples where the monetary amount does not satisfy the threshold monetary amount, the process 1100 may end at block 1114. In this example, the data associated with historical content access may not indicate that a recommendation should be sent to the user device associated with the user account.

Figure 12:
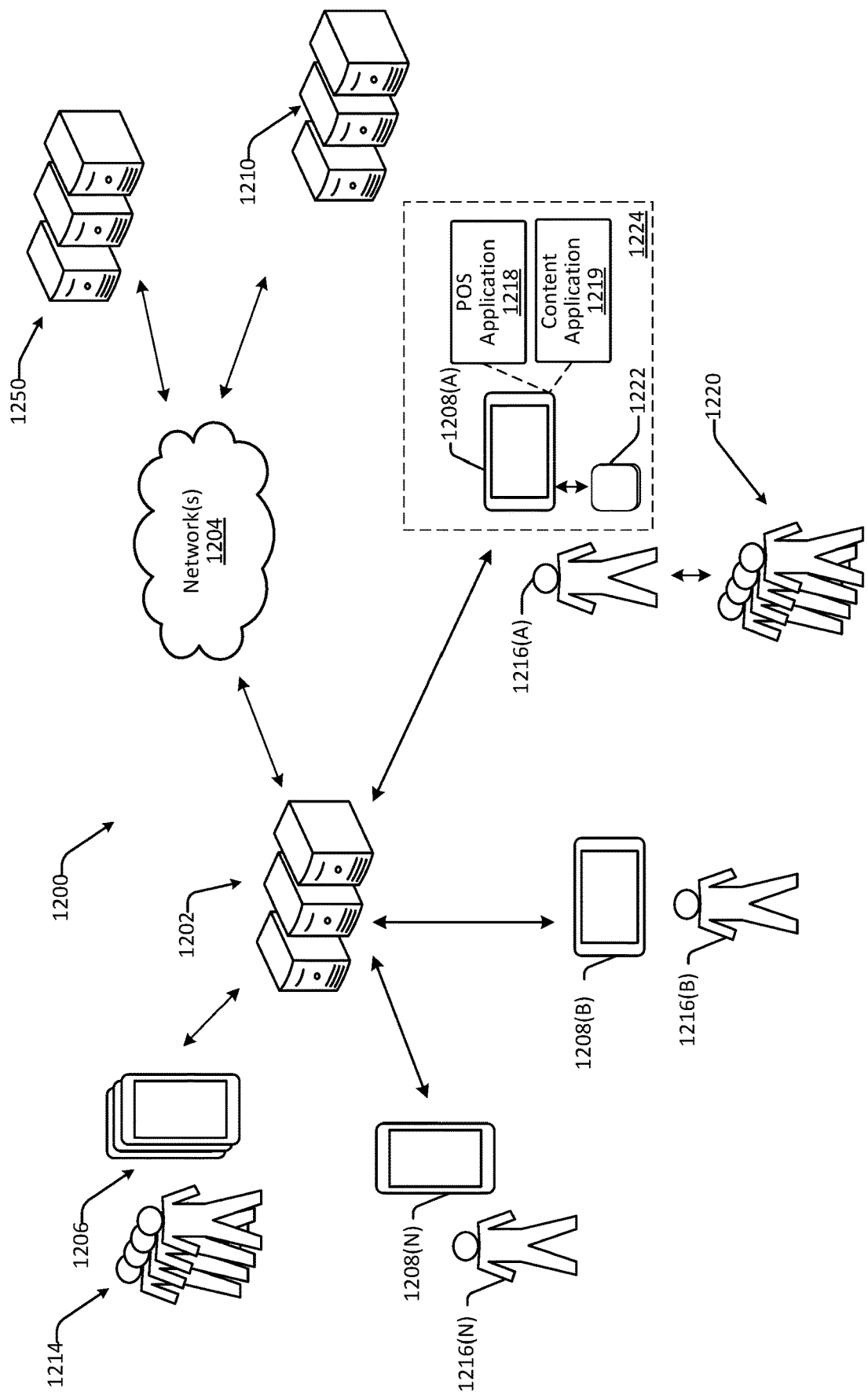
FIG. 12 is an example environment with user devices, merchant devices, a payment service, and/or other systems that may be involved in a transaction, such as by utilizing the payment application as configured herein, according to an embodiment described herein.

FIG. 12 is an example environment with user devices, merchant devices, a payment service, and/or other systems that may be involved in a transaction, such as by utilizing the payment application as configured herein, according to an embodiment described herein. The environment 1200 includes server(s) 1202 that can communicate over a network 1204 with user devices 1206 (which, in some examples can be merchant devices 1208 (individually, 1208(A)-1208(N))) and/or server(s) 1210 associated with third-party service provider(s). The server(s) 1202 can be associated with a service provider that can provide one or more services for the benefit of users 1214, as described below. Actions attributed to the service provider can be performed by the server(s) 1202. FIG. 12 also illustrates a content provider 1250, which may perform one or more operations associated with the provision of content to the user devices 1206 and/or to facilitate the use of an application residing on the user devices 1206 to pay for access to access-restricted content. The content provider 1250 can correspond to the content provider 150 of FIG. 1.

In examples, the user devices 102 from FIG. 1 may have the same or similar components and perform the same or similar functionality as the user devices 1206 from FIG. 12. Additionally, the server(s) 1202 may be the same as or similar to the payment service 104 from FIG. 1. Additionally, the merchant devices 1208 may be associated with content providers as described herein. In this example, a content application 1219 may be associated with the merchant devices 1208. Furthermore, the server(s) 1210 associated with third-party service provider(s) may be the same as or similar to the systems associated with content providers as described herein.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include merchants 1216 (individually, 1216(A)-1216(N)). In an example, the merchants 1216 can operate respective merchant devices 1208, which can be user devices 1206 configured for use by merchants 1216. For the purpose of this discussion, a "merchant" can be any entity that offers items (e.g., goods or services) for purchase or other means of acquisition (e.g., rent, borrow, barter, etc.). The merchants 1216 can offer items for purchase or other means of acquisition via brick-and-mortar stores, mobile stores (e.g., pop-up shops, food trucks, etc.), online stores, combinations of the foregoing, and so forth. In some examples, at least some of the merchants 1216 can be associated with a same entity but can have different merchant locations and/or can have franchise/franchisee relationships. In additional or alternative examples, the merchants 1216 can be different merchants. That is, in at least one example, the merchant 1216(A) is a different merchant than the merchant 1216(B) and/or the merchant 1216(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1208 can have an instance of a POS application 1218 stored thereon. The POS application 1218 can configure the merchant device 1208 as a POS terminal, which enables the merchant 1216(A) to interact with one or more customers 1220. As described above, the users 1214 can include customers, such as the customers 1220 shown as interacting with the merchant 1216(A). For the purpose of this discussion, a "customer" can be any entity that acquires items from merchants. While only two customers 1220 are illustrated in FIG. 12, any number of customers 1220 can interact with the merchants 1216. Further, while FIG. 12 illustrates the customers 1220 interacting with the merchant 1216(A), the customers 1220 can interact with any of the merchants 1216.

In at least one example, interactions between the customers 1220 and the merchants 1216 that involve the exchange of funds (from the customers 1220) for items (from the merchants 1216) can be referred to as "transactions." In at least one example, the POS application 1218 can determine transaction data associated with the POS transactions. Transaction data can include payment information, which can be obtained from a reader device 1222 associated with the merchant device 1208(A), user authentication data, purchase amount information, point-of-purchase information (e.g., item(s) purchased, date of purchase, time of purchase, etc.), etc. The POS application 1218 can send transaction data to the server(s) 1202 such that the server(s) 1202 can track transactions of the customers 1220, merchants 1216, and/or any of the users 1214 over time. Furthermore, the POS application 1218 can present a UI to enable the merchant 1216(A) to interact with the POS application 1218 and/or the service provider via the POS application 1218.

In at least one example, the merchant device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the merchant device 1208(A), such as a microphone port, a headphone port, an audio-jack, a data port, or other suitable port. In additional or alternative examples, the reader device 1222 can be coupled to the merchant device 1208(A) via another wired or wireless connection, such as via a Bluetooth®, BLE, and so on. Additional details are described below with reference to FIG. 7. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1222, and communicate with the server(s) 1202, which can provide, among other services, a payment processing service. The server(s) 1202 associated with the service provider can communicate with server(s) 1210, as described below. In this manner, the POS terminal and reader device 1222 may collectively process transaction(s) between the merchants 1216 and customers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the customers 1220. In additional or alternative examples, the POS terminal can have a display integrated therein for presenting information to the customers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a customer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a customer 1220 slides a card, or other payment instrument, having a magnetic strip through a reader device 1222 that captures payment data contained in the magnetic strip. A dip is a card-present transaction where a customer 1220 inserts a payment instrument having an embedded microchip (i.e., chip) into a reader device 1222 first. The dipped payment instrument remains in the payment reader until the reader device 1222 prompts the customer 1220 to remove the card, or other payment instrument. While the payment instrument is in the reader device 1222, the microchip can create a one-time code which is sent from the POS system 1224 to the server(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1224, the server(s) 1202, and/or the server(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1210. As described above, in at least one example, the server(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1210 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1210 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1210 associated therewith), and a payment authorization message is communicated from the issuer to the POS device via a path opposite of that described above, or via an alternate path.

As described above, the server(s) 1210, which can be associated with payment service provider(s), may determine whether the transaction is authorized based on the transaction data, as well as information relating to parties to the transaction (e.g., the customer 1220 and/or the merchant 1216(A)). The server(s) 1210 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1210 to authorize or decline transactions.

Based on the authentication notification that is received by the POS system 1224 from server(s) 1202, the merchant 1216(A) may indicate to the customer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1214 can access all of the services of the service provider. In other examples, the users 1214 can have gradated access to the services, which can be based on risk tolerance, IDV outputs, subscriptions, and so on. In at least one example, access to such services can be availed to the merchants 1216 via the POS application 1218. In additional or alternative examples, each service can be associated with its own access point (e.g., application, web browser, etc.).

The service provider can offer payment processing services for processing payments on behalf of the merchants 1216, as described above. For example, the service provider can provision payment processing software, payment processing hardware and/or payment processing services to merchants 1216, as described above, to enable the merchants 1216 to receive payments from the customers 1220 when conducting POS transactions with the customers 1220. For instance, the service provider can enable the merchants 1216 to receive cash payments, payment card payments, and/or electronic payments from customers 1220 for POS transactions and the service provider can process transactions on behalf of the merchants 1216.

As the service provider processes transactions on behalf of the merchants 1216, the service provider can maintain accounts or balances for the merchants 1216 in one or more ledgers. For example, the service provider can analyze transaction data received for a transaction to determine an amount of funds owed to a merchant 1216(A) for the transaction. In at least one example, such an amount can be a total purchase price less fees charged by the service provider for providing the payment processing services. Based on determining the amount of funds owed to the merchant 1216(A), the service provider can deposit funds into an account of the merchant 1216(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1216(A) to a bank account of the merchant 1216(A) that is held at a bank or other financial institution (e.g., associated with the server(s) 1210). Scheduled deposits can occur at a prearranged time after a POS transaction is funded, which can be a business day after the POS transaction occurred, or sooner or later. In some examples, the merchant 1216(A) can access funds prior to a scheduled deposit. For instance, the merchant 1216(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1216(A) can have a payment instrument that is linked to the stored balance that enables the merchant to access the funds without first transferring the funds from the account managed by the service provider to the bank account of the merchant 1216(A).

In at least one example, the service provider may provide inventory management services. That is, the service provider may provide inventory tracking and reporting. Inventory management services may enable the merchant 1216(A) to access and manage a database storing data associated with a quantity of each item that the merchant 1216(A) has available (i.e., an inventory). Furthermore, in at least one example, the service provider can provide catalog management services to enable the merchant 1216(A) to maintain a catalog, which can be a database storing data associated with items that the merchant 1216(A) has available for acquisition (i.e., catalog management services). In at least one example, the catalog may include a plurality of data items and a data item of the plurality of data items may represent an item that the merchant 1216(A) has available for acquisition. The service provider can offer recommendations related to pricing of the items, placement of items on the catalog, and multi-party fulfilment of the inventory.

In at least one example, the service provider can provide business banking services, which allow the merchant 1216(A) to track deposits (from payment processing and/or other sources of funds) into an account of the merchant 1216(A), payroll payments from the account (e.g., payments to employees of the merchant 1216(A)), payments to other merchants (e.g., business-to-business) directly from the account or from a linked debit card, withdrawals made via scheduled deposit and/or instant deposit, etc. Furthermore, the business banking services can enable the merchant 1216(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1216 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1216. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1212 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1216. In at least one example, the service provider can recommend and/or generate content items to supplement omni-channel presences of the merchants 1216. That is, if a merchant of the merchants 1216 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1214 to set schedules for scheduling appointments and/or users 1214 to schedule appointments.

In some examples, the service provider can provide restaurant management services to enable users 1214 to make and/or manage reservations, to monitor front-of-house and/or back-of-house operations, and so on. In such examples, the merchant device(s) 1208 and/or server(s) 1202 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1206.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1214 may be new to the service provider such that the user 1214 that has not registered (e.g., subscribed to receive access to one or more services offered by the service provider) with the service provider. The service provider can offer onboarding services for registering a potential user 1214 with the service provider. In some examples, onboarding can involve presenting various questions, prompts, and the like to a potential user 1214 to obtain information that can be used to generate a profile for the potential user 1214. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1214 providing all necessary information, the potential user 1214 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server (s) 1210). That is, the service provider can offer IDV services to verify the identity of users 1214 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1214 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1210 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1202) and/or the server(s) 1210 via the network(s) 1204. In some examples, the merchant device(s) 1208 are not capable of connecting with the service provider (e.g., the server(s) 1202) and/or the server(s) 1210, due to a network connectivity issue, for example. In additional or alternative examples, the server(s) 1202 are not capable of communicating with the server(s) 1210 due to network connectivity issue, for example. In such examples, devices may operate in "offline" mode where at least some payment data is stored (e.g., on the merchant device(s) 1208) and/or the server(s) 1202 until connectivity is restored and the payment data can be transmitted to the server(s) 1202 and/or the server(s) 1210 for processing.

In at least one example, the service provider can be associated with a hub, such as an order hub, an inventory hub, a fulfillment hub and so on, which can enable integration with one or more additional service providers (e.g., associated with the additional server(s) 1210). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1206 that are in communication with one or more server computing devices 1202 of the service provider. That is, techniques described herein are directed to a specific implementation—or, a practical application—of utilizing a distributed system of user devices 1206 that are in communication with one or more server computing devices 1202 of the service provider to perform a variety of services, as described above. The unconventional configuration of the distributed system described herein enables the server(s) 1202 that are remotely-located from end-users (e.g., users 1214) to intelligently offer services based on aggregated data associated with the end-users, such as the users 1214 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1214 and user devices 1206. Furthermore, such features are changed dynamically based on the profiles of the users involved interacting with the GUIs. As such, techniques described herein are directed to improvements to computing systems.

Figure 13:
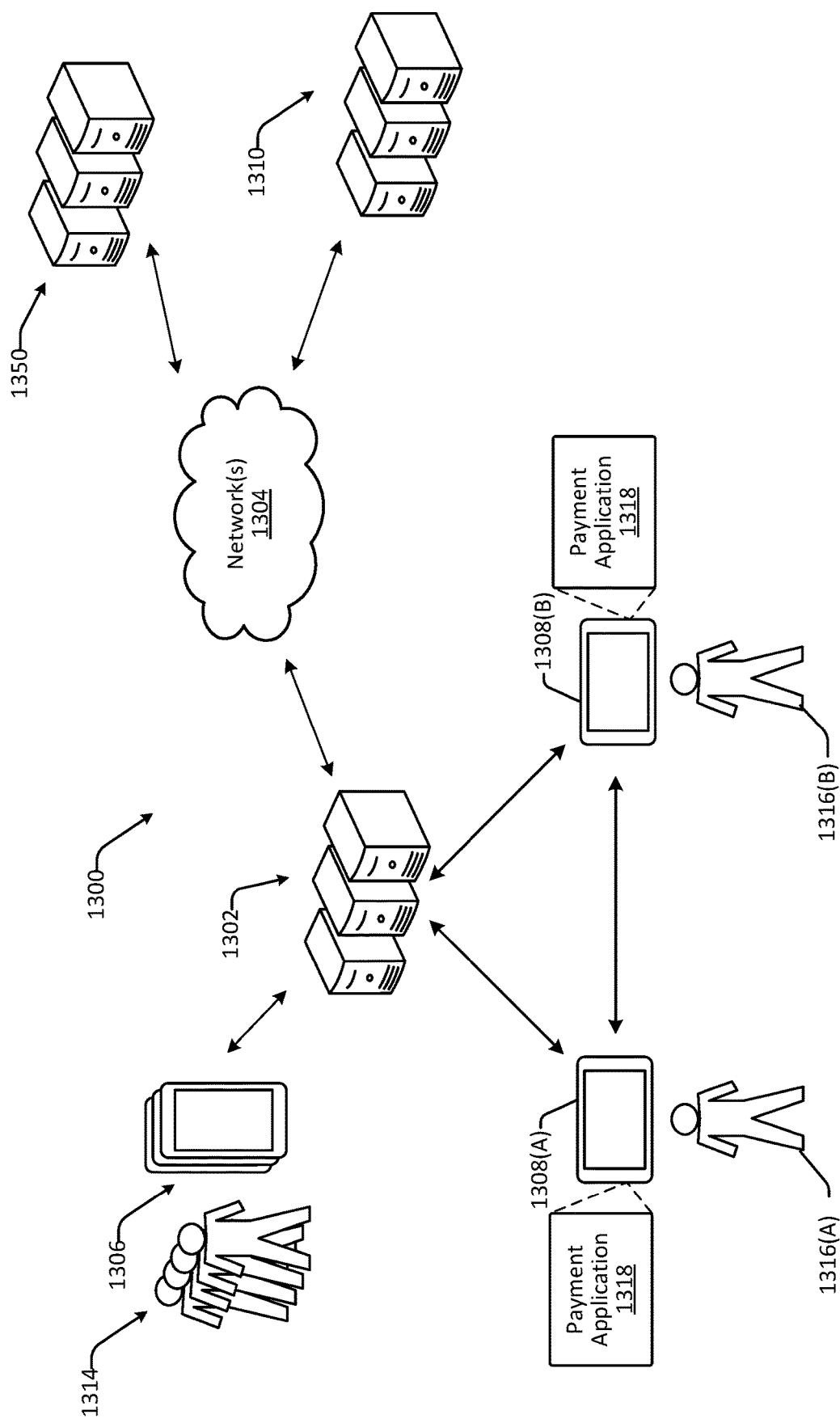
FIG. 13 is an example environment illustrating usage of the payment application, such as described herein, according to an embodiment described herein.

FIG. 13 is an example environment illustrating usage of the payment application, according to an embodiment described herein. The environment 1300 includes server(s) 1302 that can communicate over a network 1304 with user devices 1306 (which, in some examples can be user devices 1308 (individually, 1308(A), 1308(B)) and/or server(s) 1310 associated with third-party service provider(s). The server(s) 1302 can be associated with a service provider that can provide one or more services for the benefit of users 1314, as described below. Actions attributed to the service provider can be performed by the server(s) 1302. In some examples, the service provider referenced in FIG. 12 can be the same or different than the service provider referenced in FIG. 13.

As described herein, the server(s) 1302 may be the same or similar to the payment service 104 described with respect to FIG. 1. The user devices 1306, 1308 may be the same or similar to the user devices 102 described with respect to FIG. 1. The server(s) 1310 associated with third-party service provider(s) may be the same or similar to the content providers or content publishers described herein. FIG. 13 also illustrates a content provider 1350, which may perform one or more operations associated with the provision of content to the user devices 1306, 1308 and/or to facilitate the use of an application 1318 residing on the user devices 1306, 1308 to pay for access to access-restricted content. The content provider 1350 can correspond to the content provider 150 of FIG. 1.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as customers, buyers, merchants, sellers, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

In at least one example, the service provider can provide a peer-to-peer payment service that enables peer-to-peer payments between two or more users 1314. Two users, user 1316(A) and user 1316(B) are illustrated in FIG. 13 as "peers" in a peer-to-peer payment. In at least one example, the service provider can communicate with instances of a payment application 1318 (or other access point) installed on devices 1306 configured for operation by users 1314. In an example, an instance of the payment application 1318 executing on a first device 1308(A) operated by a payor (e.g., user 1316(A)) can send a request to the service provider to transfer an asset (e.g., fiat currency, non-fiat currency, cryptocurrency, securities, gift cards, and/or related assets) from the payor to a payee (e.g., user 1316(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 14:
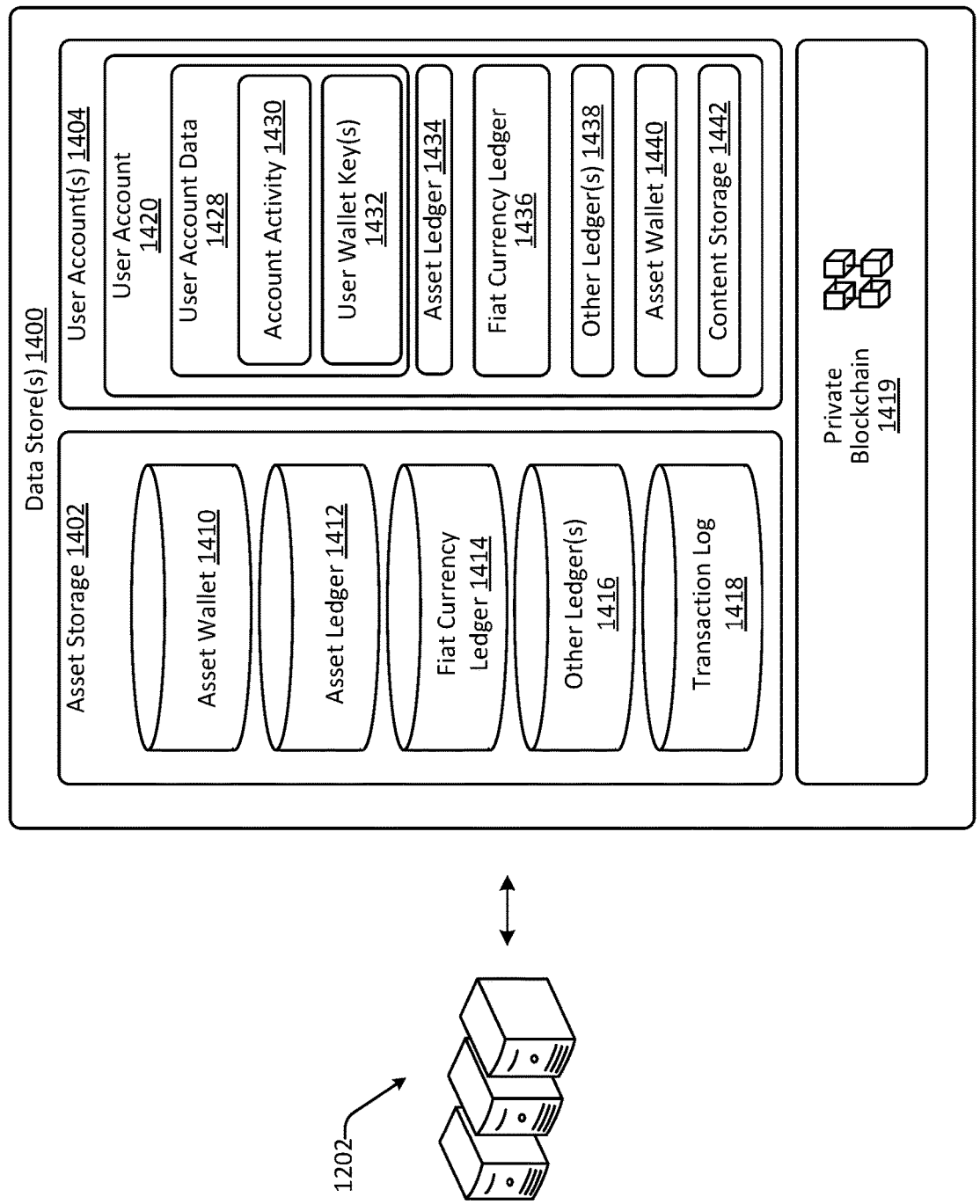
FIG. 14 is an example of data store(s) that can be associated with servers of the payment service, according to an embodiment described herein.

In some examples, the service provider can utilize a ledger system to track transfers of assets between users 1306. FIG. 14, below, provides additional details associated with such a ledger system. The ledger system can enable users 1306 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1318 executing on user device(s) of payee(s). As an example, the service provider can transfer assets from an account of user 1316(A) to an account of the user 1316(B) and can send a notification to the user device 1308(B) of the user 1316(B) for presentation via a user interface. The notification can indicate that a transfer is in process, a transfer is complete, or the like. In some examples, the service provider can send additional or alternative information to the instances of the payment application 1318 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1302 to treat the inputs as a request from the payor to transfer assets, where detection of the syntax triggers a transfer of assets. The currency indicator can correspond to various currencies including but not limited to, dollar ($), euro (€), pound (£), rupee ((₹)), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1318 executing on the user devices 1306. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 13 or a third-party service provider associated with the server(s) 1310. In examples where the content provider is a third-party service provider, the server(s) 1310 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 13. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server(s) 1302 (which, in such an example can be called a "messaging server"). In some instances, the messaging application can include a payment application with messaging capability that enables users of the payment application to communicate with one another. In such instances, the payment application can be executed on a user device 1306 based on instructions transmitted to and from the server(s) 1302 (e.g., the payment service discussed in this description or another payment service that supports payment transactions). In some examples, the messaging application can be provided by a third-party service provider associated with the server(s) 1310. In examples where the messaging application is a third-party service provider, the server(s) 1310 can be accessible via one or more APIs or other integrations.

As described above, the service provider can facilitate peer-to-peer transactions, which can enable users 1306 to transfer fiat currency, non-fiat currency, cryptocurrency, securities, or other assets, or portions thereof, to other users 1306. In at least one example, individual users can be associated with user accounts. Additional details associated with user accounts and the transfer of assets between users 1306 are described below with reference to FIG. 14.

Furthermore, the service provider of FIG. 13 can enable users 1306 to perform banking transactions via instances of the payment application 1318. For example, users can configure direct deposits or other deposits for adding assets to their various ledgers/balances. Further, users 1306 can configure bill pay, recurring payments, and/or the like using assets associated with their accounts. In addition to sending and/or receiving assets via peer-to-peer transactions, users 1306 buy and/or sell assets via asset networks such as cryptocurrency networks, securities networks, and/or the like.

FIG. 14 is an example of data store(s) that can be associated with servers of the payment service, according to an embodiment described herein. In at least one example, the data store(s) 1400 can store assets in an asset storage 1402, as well as data in user account(s) 1404, merchant account(s) 1406, and/or customer account(s) 1408. In at least one example, the asset storage 1402 can be used to store assets managed by the service provider of FIG. 13. In at least one example, the asset storage 1402 can be used to record whether individual of the assets are registered to users. For example, the asset storage 1402 can include an asset wallet 1410 for storing records of assets owned by the service provider of FIG. 13, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1310 can be associated therewith. In some examples, the asset wallet 1410 can communication with the asset network via one or more components associated with the server(s) 1302.

The asset wallet 1410 can be associated with one or more addresses and can vary addresses used to acquire assets (e.g., from the asset network(s)) so that its holdings are represented under a variety of addresses on the asset network. In examples where the service provider of FIG. 13 has its own holdings of cryptocurrency (e.g., in the asset wallet 1410), a user can acquire cryptocurrency directly from the service provider of FIG. 13. In some examples, the service provider of FIG. 13 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1402 may contain ledgers that store records of assignments of assets to users 1306. Specifically, the asset storage 1402 may include asset ledger 1410, fiat currency ledger 1414, and other ledger(s) 1416, which can be used to record transfers of assets between users 1306 of the service provider and/or one or more third-parties (e.g., merchant network(s), payment card network(s), ACH network(s), equities network(s), the asset network, securities networks, etc.). In doing so, the asset storage 1402 can maintain a running balance of assets managed by the service provider of FIG. 13. The ledger(s) of the asset storage 1402 can further indicate some of the running balance for each of the ledger(s) stored in the asset storage 1402 is assigned or registered to one or more user account(s) 1404.

In at least one example, the asset storage 1402 can include transaction logs 1418, which can include records of past transactions involving the service provider of FIG. 13. In at least one example, transaction data, as described herein, can be stored in association with the transaction logs 1418.

In some examples, the data store(s) 1400 can store a private blockchain 1419. A private blockchain 1419 can function to record sender addresses, recipient addresses, public keys, values of cryptocurrency transferred, and/or can be used to verify ownership of cryptocurrency tokens to be transferred. In some examples, the service provider of FIG. 13 can record transactions taking place within the service provider of FIG. 13 involving cryptocurrency until the number of transactions has exceeded a determined limit (e.g., number of transactions, storage space allocation, etc.). Based at least in part on determining that the limit has been reached, the service provider of FIG. 13 can publish the transactions in the private blockchain 1419 to a public blockchain (e.g., associated with the asset network), where miners can verify the transactions and record the transactions to blocks on the public blockchain. In at least one example, the service provider of FIG. 13 can participate as miner(s) at least for its transactions to be posted to the public blockchain.

In at least one example, the data store(s) 1400 can store and/or manage accounts, such as user account(s) 1404, merchant account(s) 1406, and/or customer account(s) 1408. In at least one example, the user account(s) 1404 may store records of user accounts associated with the users 1306. In at least one example, the user account(s) 1404 can include a user account 1420, which can be associated with a user (of the users 1306). Other user accounts of the user account(s) 1404 can be similarly structured to the user account 1420, according to some examples. In other examples, other user accounts may include more or less data and/or account information than that provided by the user account 1420. In at least one example, the user account 1420 can include user account data 1428, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1428 can include account activity 1430 and user wallet key(s) 1432. The account activity 1430 may include a transaction log for recording transactions associated with the user account 1420. In some examples, the user wallet key(s) 1432 can include a public-private key-pair and a respective address associated with the asset network or other asset networks. In some examples, the user wallet key(s) 1432 may include one or more key pairs, which can be uni3ue to the asset network or other asset networks.

In addition to the user account data 1428, the user account 1420 can include ledger(s) for account(s) managed by the service provider of FIG. 13, for the user. For example, the user account 1420 may include an asset ledger 1434, a fiat currency ledger 1436, and/or one or more other ledgers 1438. The ledger(s) can indicate that a corresponding user utilizes the service provider of FIG. 13 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 13.

In some examples, the asset ledger 1434 can store a balance for each of one or more cryptocurrencies (e.g., Bitcoin, Ethereum, Litecoin, etc.) registered to the user account 1420. In at least one example, the asset ledger 1434 can further record transactions of cryptocurrency assets associated with the user account 1420. For example, the user account 1420 can receive cryptocurrency from the asset network using the user wallet key(s) 1432. In some examples, the user wallet key(s) 1432 may be generated for the user upon request. User wallet key(s) 1432 can be requested by the user in order to send, exchange, or otherwise control the balance of cryptocurrency held by the service provider of FIG. 13 (e.g., in the asset wallet 1410) and registered to the user. In some examples, the user wallet key(s) 1432 may not be generated until a user account re3uires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 13 and the value is credited as a balance in asset ledger 1434), by purchasing currency in the form associated with the account using currency in a different form (e.g., buying a value of cryptocurrency from the service provider of FIG. 13 using a value of fiat currency reflected in fiat currency ledger 206, and crediting the value of cryptocurrency in asset ledger 1434), or by conducting a transaction with another user (customer or merchant) of the service provider of FIG. 13 wherein the account receives incoming currency (which can be in the form associated with the account or a different form, in which the incoming currency may be converted to the form associated with the account). In some examples, the user account data 1428 can include preferences for maintaining balances of individual of the ledgers. For example, the service provider of FIG. 13 can automatically debit the fiat currency ledger 1436 to increase the asset ledger 1434, or another account associated with the user whenever the cryptocurrency balance (e.g., of the asset ledger 1434) falls below a stated level (e.g., a threshold). Conversely, in some embodiments, the service provider of FIG. 13 can automatically credit the fiat currency ledger 1436 to decrease the asset ledger 1434 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 13 (i.e., an external account). In at least one example, the user can transfer all or a portion of a balance of the cryptocurrency stored in the third-party cryptocurrency wallet to the service provider of FIG. 13. Such a transaction can require the user to transfer an amount of the cryptocurrency in a message signed by user's private key to an address provided by the service provider of FIG. 13. In at least one example, the transaction can be sent to miners to bundle the transaction into a block of transactions and to verify the authenticity of the transactions in the block. Once a miner has verified the block, the block is written to a public, distributed blockchain where the service provider of FIG. 13 can then verify that the transaction has been confirmed and can credit the user's asset ledger 1434 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 13. As described above, in some examples, the service provider of FIG. 13 can acquire cryptocurrency from a third-party source (e.g., associated with the third-party server(s) 118). In such examples, the asset wallet 1410 can be associated with different addresses and can vary addresses used to acquire cryptocurrency so that its holdings are represented under a variety of addresses on a blockchain. When the service provider of FIG. 13 has their own holdings of cryptocurrency, users can acquire cryptocurrency directly from the service provider of FIG. 13. In some examples, the service provider of FIG. 13 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 13 has its own cryptocurrency assets, cryptocurrency transferred in a transaction (e.g., data with address provided for receipt of transaction and a balance of cryptocurrency transferred in the transaction) can be stored in the asset wallet 1410. In at least one example, the service provider of FIG. 13 can credit the asset ledger 1434 of the user. Additionally, while the service provider of FIG. 13 recognizes that the user retains the value of the transferred cryptocurrency through crediting the asset ledger 1434, any person that inspects the blockchain will see the cryptocurrency as having been transferred to the service provider of FIG. 13. In some examples, the asset wallet 1410 can be associated with many different addresses. In such examples, any person that inspects the blockchain may not easily associate all cryptocurrency stored in asset wallet 1410 as belonging to the same entity. It is this presence of a private ledger that is used for real-time transactions and maintained by the service provider of FIG. 13, combined with updates to the public ledger at other times, that allows for extremely fast transactions using cryptocurrency to be achieved. In some examples, the "private ledger" can refer to the asset ledger 1410, which in some examples, can utilize the private blockchain 1419, as described herein. The "public ledger" can correspond to a public blockchain associated with the asset network.

In at least one example, a user's asset ledger 1434, fiat currency ledger 1436, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1434. In some examples, a user can receive fiat currency or another currency in the form of payment for a transaction with another user. In at least one example, at least a portion of such funds can be converted into cryptocurrency by the service provider of FIG. 13 and used to fund the asset ledger 1434 of the user.

As addressed above, in some examples, users can also have other accounts maintained by the service provider of FIG. 13. For example, a user can also have an account in U.S. dollars, which can be tracked, for example, via the fiat currency ledger 1436. Such an account can be funded by transferring money from a bank account at a third-party bank to an account maintained by the service provider of FIG. 13 as is conventionally known. In some examples, a user can receive fiat currency in the form of payment for a transaction with another user. In such examples, at least a portion of such funds can be used to fund the fiat currency ledger 1436.

In some examples, a user can have one or more internal payment cards registered with the service provider of FIG. 13. Internal payment cards can be linked to one or more of the accounts associated with the user account 1420. In some embodiments, options with respect to internal payment cards can be adjusted and managed using an application (e.g., the payment application 1318).

In at least one example, as described above, each ledger can correspond to an account of the user that is managed by the service provider of FIG. 13. In at least one example, individual of the accounts can be associated with a wallet or a stored balance for use in payment transactions, peer-to-peer transactions, payroll payments, etc.

In at least one example, the user account 1420 can be associated with an asset wallet 1440. The asset wallet 1440 of the user can be associated with account information that can be stored in the user account data 1428 and, in some examples, can be associated with the user wallet key(s) 1432. In at least one example, the asset wallet 1440 can store data indicating an address provided for receipt of a cryptocurrency transaction. In at least one example, the balance of the asset wallet 1440 can be based at least in part on a balance of the asset ledger 1434. In at least one example, funds availed via the asset wallet 1440 can be stored in the asset wallet 1440 or the asset wallet 1410. Funds availed via the asset wallet 1410 can be tracked via the asset ledger 1434. The asset wallet 1440, however, can be associated with additional cryptocurrency funds.

In at least one example, when the service provider of FIG. 13 includes a private blockchain 1419 for recording and validating cryptocurrency transactions, the asset wallet 1440 can be used instead of, or in addition to, the asset ledger 1434. For example, at least one example, a merchant can provide the address of the asset wallet 1440 for receiving payments. In an example where a customer is paying in cryptocurrency and the customer has their own cryptocurrency wallet account associated with the service provider of FIG. 13, the customer can send a message signed by its private key including its wallet address (i.e., of the customer) and identifying the cryptocurrency and value to be transferred to the merchant's asset wallet 1440. The service provider of FIG. 13 can complete the transaction by reducing the cryptocurrency balance in the customer's cryptocurrency wallet and increasing the cryptocurrency balance in the merchant's asset wallet 1440. In addition to recording the transaction in the respective cryptocurrency wallets, the transaction can be recorded in the private blockchain 1419 and the transaction can be confirmed. A user can perform a similar transaction with cryptocurrency in a peer-to-peer transaction as described above. In at least one example, the cryptocurrency wallet account 1430 can be funded by a balance transfer from a third-party cryptocurrency wallet, as described above. Such a transaction can re3uire a user to transfer an amount of cryptocurrency in a message signed by the user's private key to an address of the cryptocurrency wallet account 1430. The transferred amount of cryptocurrency can then be within the cryptocurrency wallet account 1430 for use in later transactions.

While the asset ledger 1434 and/or asset wallet 1440 are each described above with reference to cryptocurrency, the asset ledger 1434 and/or asset wallet 1440 can alternatively be used in association with securities. In some examples, different ledgers and/or wallets can be used for different types of assets. That is, in some examples, a user can have multiple asset ledgers and/or asset wallets for tracking cryptocurrency, securities, or the like.

Additionally, the user account data 1328 may include content storage 1442, which may include data representing content that has been purchased or otherwise granted access to as described herein. The content storage 1442 may store the actual content to which access has been granted and/or data indicating the enabled content. The data indicating the enabled content may be utilized to acquire the enabled content, such as from one or more remote sources.

It should be noted that user(s) having accounts managed by the service provider of FIG. 13 is an aspect of the technology disclosed that enables technical advantages of increased processing speed and improved security.

Figure 15:
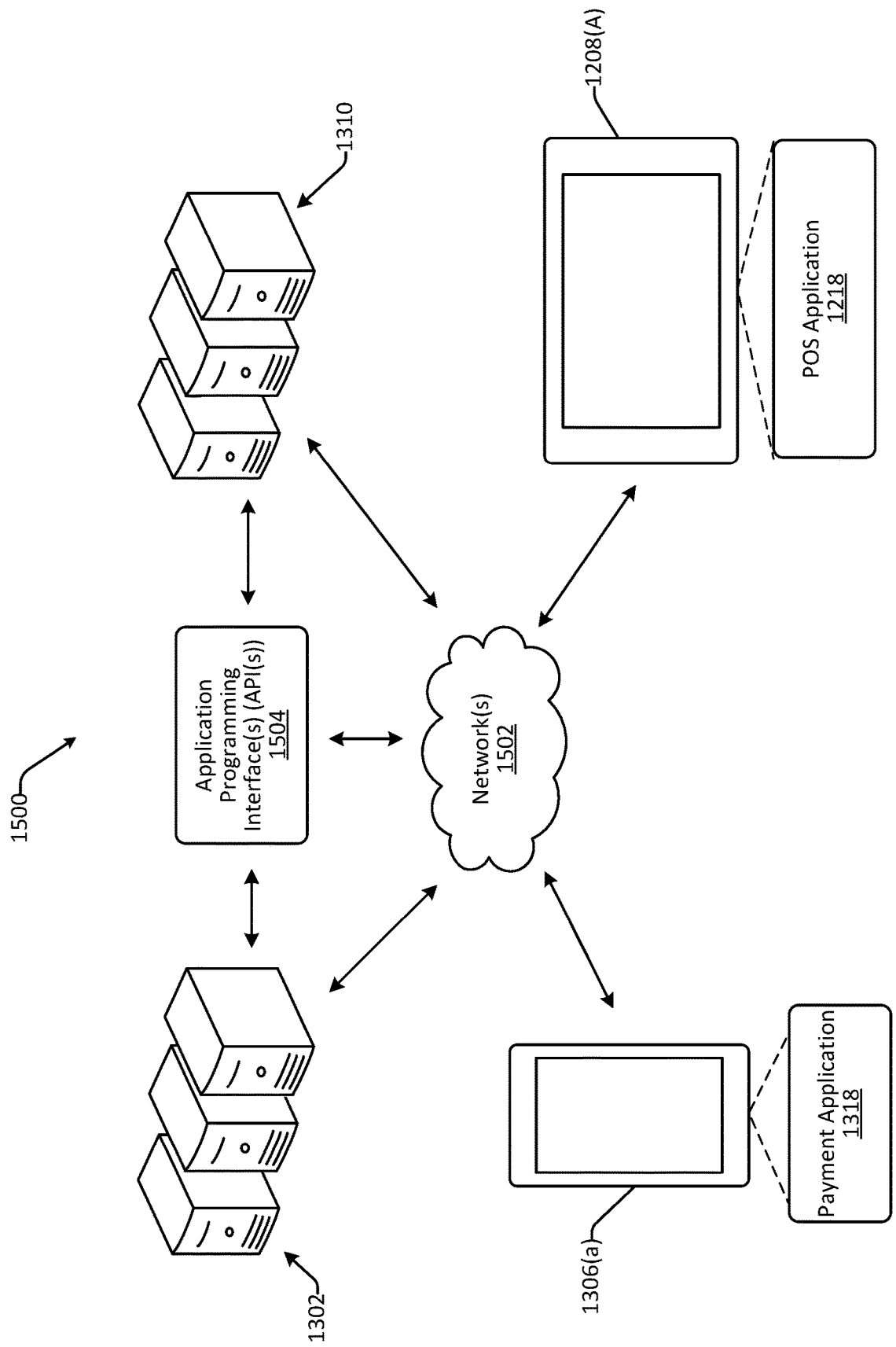
FIG. 15 is an example environment wherein the payment service environment of FIG. 12 and the environment from FIG. 13 can be integrated to enable payments at the point-of-sale using assets associated with user accounts in the peer-to-peer environment of FIG. 13, according to an embodiment described herein.

FIG. 15 is an example environment 1500 wherein the environment 1200 and the environment 1300 can be integrated to enable payments at the point-of-sale using assets associated with user accounts in the peer-to-peer environment of FIG. 13, according to an embodiment described herein. As illustrated, each of the components can communicate with one another via one or more networks 1502. In some examples, one or more APIs 1504 or other functional components can be used to facilitate such communication. For example, the APIs 1504 can be used to facilitate communication with payment service server(s) 1302 and server(s) 1310 associated with third-party service provider(s), such as content providers.

In at least one example, the example environment 1500 can enable contactless payments, via integration of peer-to-peer payment, or other payment making, platform and payment processing platform(s), are described herein. For the purpose of FIG. 15, the environment 1200 can refer to a payment processing platform and the environment 1300 can refer to a peer-to-peer payment, or payment making, platform. In an example, such an integration can enable a customer to participate in a transaction via their own computing device instead of interacting with a merchant device of a merchant, such as the merchant device 1208(A). In such an example, the POS application 1218, associated with a payment processing platform and executable by the merchant device 1208(A) of the merchant, can present a Quick Response (QR) code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize their own computing device, such as the user device 1308(A), to capture the QR code, or the other transaction code, and to provide an indication of the captured QR code, or other transaction code, to server(s) 1202 and/or server(s) 1302.

Based at least in part on the integration of the peer-to-peer payment platform and the payment processing platform (e.g., via the API), the server(s) 1202 and/or 1302 associated with each can exchange communications with each other and with a payment application 1318 associated with the peer-to-peer payment platform and/or the POS application 1218 to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1308(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1318, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1308(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a text message with a resource locator (e.g., uniform resource locator (URL)) that can be associated with a peer-to-peer payment platform to be sent to the user device 1308(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction between the customer and the resource locator presented via the customer computing device can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1308(A), to scan, or otherwise capture, the QR code. If the customer is already associated with the peer-to-peer payment platform e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1318 of a user device 1308(A) of a customer to enable the customer to participate in a transaction via their own computing device. For instance, in a "scan to pay" example as described above, based at least in part on capturing the QR code, or other transaction code, via the user device 1308(A), the payment processing platform can provide transaction data to the peer-to-peer payment platform for presentation via the payment application 1318 on the user device 1308(A). In some examples, the customer can watch items being added to their cart (e.g., via a user interface presented via the payment application). As an item is added to a virtual cart by the merchant via the POS application 1218 on the merchant device 1208(A) of the merchant the customer can see the item in their virtual cart on their Own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1318 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1308(A) during or after payment of the transaction.

In some examples, based at least in part on capturing the QR code, or other transaction code, the payment processing platform can provide transaction data to the peer-to-peer payment platform in for presentation via the payment application 1318 on the computing device of the customer, such as the user device 1308(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1318 such that the customer can provide gratuity, feedback, loyalty information, or the like, via an interaction with the user interface. In some examples, because the customer has already authorized payment via, the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1318 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 16:
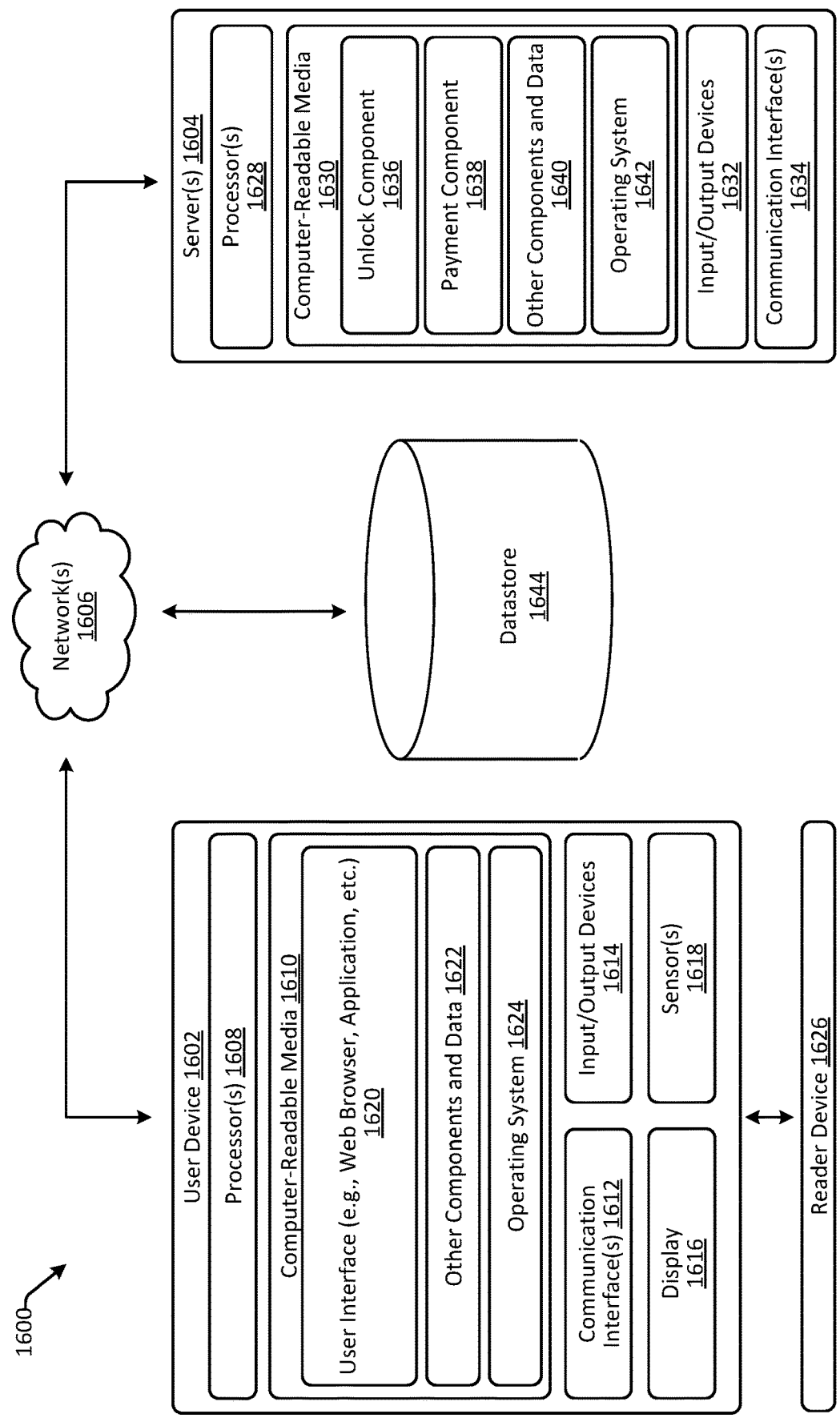
FIG. 16 is an illustrative block diagram illustrating a system for performing techniques described herein, according to an embodiment described herein.

FIG. 16 is an illustrative block diagram illustrating a system for performing techniques described herein, according to an embodiment described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 12.

The user device 1602 may be the same or similar to the user device 102 as described with respect to FIG. 1. Additionally, the server(s) 1604 may be the same or similar to the payment service 104 described with respect to FIG. 1.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, components or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider 612 associated with the server(s) 1604, or which can be an otherwise dedicated application. In some examples, the user interface 1620 can be configured to display options for withdrawing funds to access content. The user interface 1620 may also be configured to surface content, such as in association with the payment application described herein. The user interface 1620 may also be configured to display subscription preferences and to accept user input to manage those preferences. In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other components and data 1622, which can include programs, drivers, etc., and the data used or generated by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1224, described above, to provide one or more services. That is, in some examples, the service provider 1224 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1214 and/or for sending users 1214 notifications regarding available appointments with merchant(s) located proximate to the users 1214. In at least one example, location can be used for taking payments from nearby customers when they leave a geofence, or location can be used to initiate an action responsive to users 1214 enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process them as payment instruments, given that such biometric characteristics are registered with the payment service 104 and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more components and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one component for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1612, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program components, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider 612 and/or payment processing service. Functional components stored in the computer-readable media 1630 can optionally include an unlock component 1636, a payment component 1638, and one or more other components and data 1640.

The unlock component 1636 can be configured to receive transaction data from POS systems, such as the POS system 1224 described above with reference to FIG. 12. The unlock component 1636 can receive requests to authorize access to access-restricted content and to transmit data to and from a content provider. The data may include responses to access requests, funds withdrawn from a user account, links or other interactive elements, user input data from a payment application, etc. The payment component 1638 may be configured to facilitate the transfer of funds from user accounts to other accounts, such as accounts associated with content providers, to generate and transmit access tokens, to generate and transmit links and other interactive elements, etc.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1602 and/or the server(s) 1604 for use at a time after the data models have been trained (e.g., at runtime).

The one or more other components and data 1640 can also include a datastore, a preferences component, a recommendation component, and a content component, the functionality of which is described, at least partially, above. Further, the one or more other components and data 1640 can include programs, drivers, etc., and the data used or generated by the functional components. Further, the server(s) 1604 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1602 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a datastore 1644 that can be configured to store data that is accessible, manageable, and updatable. In some examples, the datastore 1644 can be integrated with the user device 1602 and/or the server(s) 1604. In other examples, as shown in FIG. 16, the datastore 1644 can be located remotely from the server(s) 1604 and can be accessible to the server(s) 1604. The datastore 1644 can comprise multiple databases and/or servers connected locally and/or remotely via the network(s) 1606.

In at least one example, the datastore 1644 can store user profiles, which can include merchant profiles, customer profiles, and so on. In some examples, the datastore(s) 1644 can store user profiles of content publishers or content providers, as described herein. In some examples, such user profiles can be associated with one or more user accounts. In some examples, a user account associated with a user profile of a content publisher or content provider can be associated with a stored balance maintained by the payment service or external account data for withdrawing or depositing funds.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1644 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1644 can store additional or alternative types of data as described herein.

Figure 17:
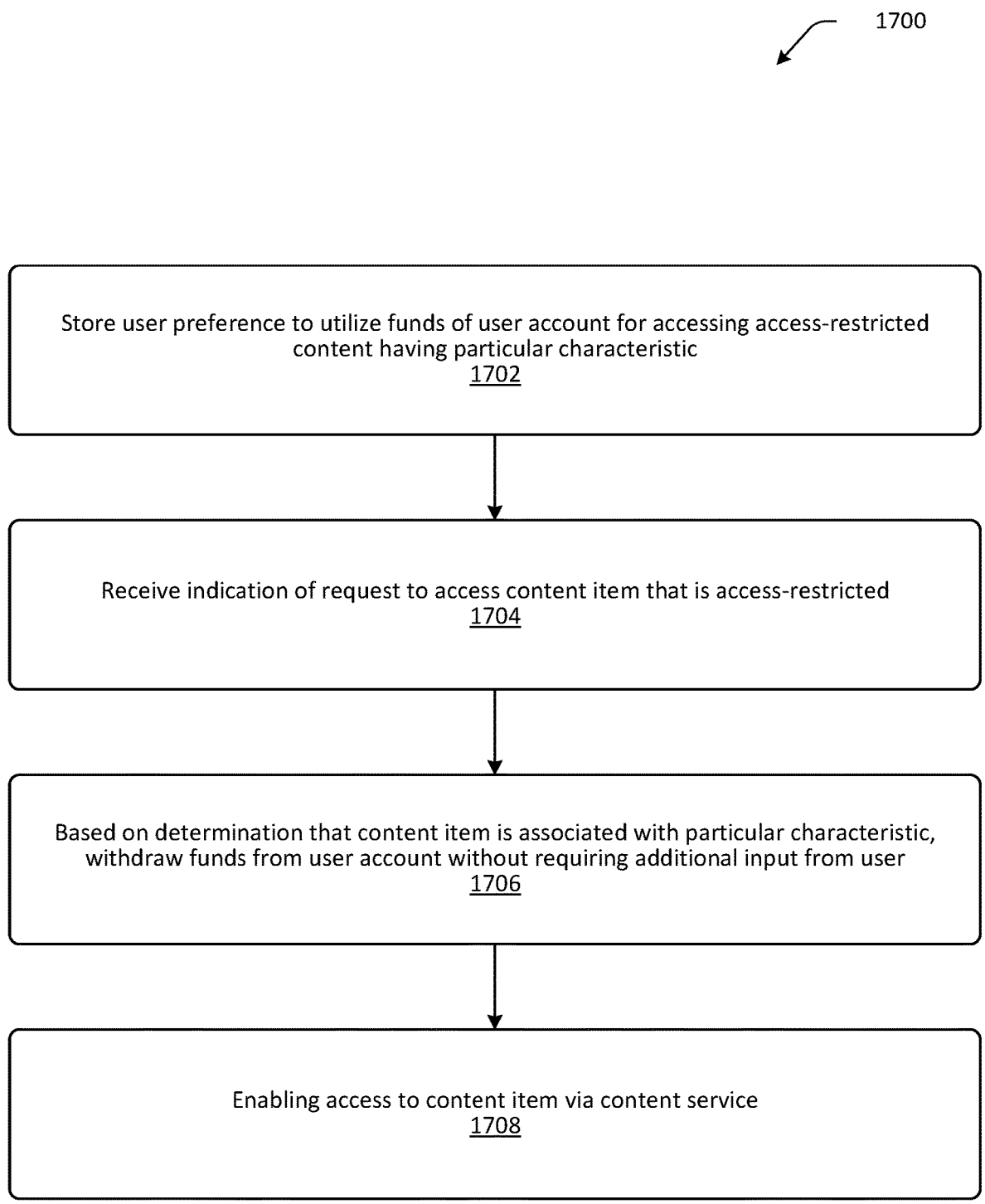
FIG. 17 is a flow diagram of an example process for enabling access to access-restricted digital content, according to an embodiment described herein.

FIG. 17 illustrates a flow diagram of an example process 1700 for enabling access to access-restricted digital content. The order in which the operations or steps are described is not intended to be construed as a limitation, and any number of the described operations may be combined in any order and/or in parallel to implement process 1700.

At block 1702, the process 1700 may include storing a user preference to utilize funds of a user account for accessing access-restricted content having a particular characteristic. For example, user preferences may take any form and may include any preference, but for example a user preference may indicate whether the user has authorized automatic withdrawal of funds from a stored balance account of the user to satisfy payment for content access, whether the user has requested the payment application to confirm that the user wants to pay for the access before proceeding with fund withdrawal, whether the user has established monetary limits for content access, or whether the user has yet to set up user preferences or whether the user preferences indicate that more user interaction is required to withdraw funds for content access. Additional user preferences may indicate withdrawal rules associated with certain content providers, certain publishers, certain content types, certain monetary amounts, certain periods of time that the rules are to be in force, rules associated with certain platforms, etc. In at least one example, the user preference(s) can be stored in a data store associated with a payment service, as described above with reference to FIG. 1.

At block 1704, the process 1700 may include receiving an indication of a request to access a content item that is access-restricted. For example, the indication may be based on user input comprising touch input, spoken input, a gesture, or the like indicating a request to access content provided by a content provider. In some examples, the web browser, application, part of the application, or the like can be provided by a content provider, including but not limited to a publishing service, a music label, a content aggregation service, or the like. In some examples, the web browser, application, part of the application, or the like can be provided by the payment service. In examples where the request is received at the content provider, a content application may be executing the foreground and the payment application may be operating in the background. In examples where the request is received at the payment application, the payment application may be executing in foreground. In some examples, the content associated with the user input can be access-restricted, as described above. In at least one example, the payment service 104 can receive the indication of the request to access the content item. In some examples, the request can be associated with an identifier of the content item (e.g., for identifying the content item), a publisher, content provider, or other merchant identifier (e.g., for identifying the source of the content), an indication of a condition to be satisfied (e.g., a cost associated with a payment to be made) to access the content, or the like.

At block 1706, the process 1700 may include, based on a determination that the content item is associated with the particular characteristic, withdrawing funds from the user account without requiring additional input from the user. In at least one example, the payment service 104 can determine whether the content item is associated with a particular characteristic, as described in more detail with respect to FIG. 1. In some examples, the payment service 104 can access the user preference(s) stored in the data store 130 and determine whether the content item is associated with a particular characteristic that corresponds to a user preference. Such a user preference can indicate a particular payment process, or other condition to be satisfied, to access the content item. Based at least in part on a determination that the content item is associated with the particular characteristic, the payment service 104 can initiate a payment process, which can be based on the user preference, to withdraw funds from the user account of the user. Withdrawal of the funds may be performed as between an unlock component and a payment component of the payment service, as described in more detail with respect to FIG. 2.

At block 1708, the process 1700 may include enabling access to the content item via the content service. Enabling access may be performed as described with respect to FIG. 2, above.

Additionally, or alternatively, the process 1700 may include storing, in association with the user account, data indicating content items to which access has been enabled. The process 1700 may also include receiving, at a time after enabling access to the content item, an indication of a request to present the content item, wherein the request to present the content item is from a requesting application executing on the user device, wherein the requesting application is either the application or the payment application, and wherein the user interface is presented via the requesting application. The process 1700 may also include determining, from the data, that the content item is one of the content items to which access has been enabled. The process 1700 may also include causing the content item to be presented via a user interface of the user device.

Additionally, or alternatively, the process 1700 may include determining that the content item is associated with the particular characteristic based at least in part on results data from at least one of: natural language processing performed on text data of the content item; image processing performed on image data of the content item; or audio processing performed on audio data of the content item.

Additionally, or alternatively, the process 1700 may include receiving, from the user device and while the payment application is executing in the foreground of the user device, a request to view, via the payment application, a user interface associated with an asset. The process 1700 may also include determining, based at least in part on the user interface being displayed, a first portion of the content items to which access has been enabled that are relevant to the asset. The process 1700 may also include causing display, in association with the first portion of the content items, of a first indicator indicating that access to the first portion of the content items has been enabled. The process 1700 may also include causing display, in association with a second portion of the content items, of a second indicator indicating that access to the second portion of the content items has yet to be enabled, wherein the second portion of the content items are purchasable using the funds associated with the stored balance.

Additionally, or alternatively, the process 1700 may include receiving an indication of a second request to access a second content item, wherein the second request includes an indication to utilize the payment application to pay for access to the second content item. The process 1700 may also include, based at least in part on the second request including the indication to utilize the payment application, withdrawing an additional portion of the funds from the stored balance without requiring the additional input from the user. The process 1700 may also include, based at least in part on withdrawing the additional portion of the funds, enabling access to the second content item.

Additionally, or alternatively, the process 1700 may include causing display, on the user device, of a user interface associated with the payment application, the user interface configured to: present one or more options for managing access to content items, the options including content types, content providers, and monetary amounts authorized for use in accessing content items; and receive user input associated with the one or more options. The process 1700 may also include receiving user input data representing the user input from the user device, the user input data indicating at least: that funds from the payment application are authorized to be utilized to pay for access to content from the content provider; and a monetary amount that is authorized to be utilized to pay for the access to the content from the content provider. The process 1700 may also include generating data representing user preferences including the user preference from the user input data. The process 1700 may also include determining the particular characteristic based at least in part on the data representing the user preferences.

Additionally, or alternatively, the process 1700 may include receiving an indication of a second request to access a second content item, the second request received in association with a web browser displaying options for presentation of content. The process 1700 may also include determining that the payment application is operating on a device executing the web browser and determining that the second content item is associated with the particular characteristic. The process 1700 may also include, based at least in part on the payment application operating on the device and the second content item being associated with the particular characteristic, enabling access to the second content item.

Additionally, or alternatively, the process 1700 may include storing, in association with the user account, transaction data indicating historical payment for access to content items by the payment application. The process 1700 may also include determining, utilizing a machine learning model trained based at least in part on the transaction data, a recommendation for at least one of a content subscription or a subscription type associated with the particular characteristic. The process 1700 may also include causing the payment application to present the recommendation.

Additionally, or alternatively, the process 1700 may include receiving first data indicating that the user device is displaying first subject matter. The process 1700 may also include causing, based at least in part on the user device displaying the first subject matter, a user interface to display indicators of content items associated with the first subject matter. The process 1700 may also include determining a portion of the content items to which access has yet to be enabled. The process 1700 may also include causing display of the indicators in a ranked order, with the indicators associated with the portion of the content items being ranked more favorably than other ones of the content items.

Additionally, or alternatively, the process 1700 may include determining that the content item is associated with an active subscription associated with the payment service. In such examples, the payment service can cover the cost of the content item in its subscription and can charge an amount to the user for access to the content item. In some examples, the amount charged to the user can be based on the content item, user characteristics (e.g., frequency of use, recency of use, membership tier, loyalty, etc.), or the like. The process 1700 may also include facilitating transfer of a portion of the funds from the user account to an account of the payment service, for example, to cover the amount charged to the user for access to the content item.

Additionally, or alternatively, the process 1700 may include storing, in association with the user account, first data indicating prior purchases of content access. The process 1700 may also include determining, from the first data and over a period of time, second data indicating at least one of a number of times content access has been purchased from the content provider or a monetary amount provided to the content provider for the content access. The process 1700 may also include identifying content subscriptions associated with the content provider and generating a recommendation to subscribe to at least one of the content subscriptions based at least in part on the number of times the content access has been purchased or the monetary amount, wherein the particular characteristic of the content item includes an indication that the at least one of the content subscriptions has been selected to be subscribed to.

Additionally, or alternatively, the process 1700 may include causing display, on the user device, of a user interface associated with the payment application, the user interface configured to: present publisher indications; present a first option for causing automatic withdrawal of funds to gain access to content items; and present a second option for causing the payment application to request user input confirming withdrawal of the funds to gain access to the content items. The process 1700 may also include receiving, via the user interface, first user input data indicating selection of the first option in association with a first publisher of the publisher indications. The process 1700 may also include receiving, via the user interface, second user input data indicating selection of the second option in association with a second publisher of the publisher indications. The process 1700 may also include generating first data representing user preferences including the user preference from the first user input data and the second user input data.

Additionally, or alternatively, the process 1700 may include storing, in association with the user account, first data indicating content items to which access has been enabled. The process 1700 may also include receiving, from a second content provider unassociated with the first content provider, an indication of a second request to present the content item. The process 1700 may also include determining, from the first data, that the content item is one of the content items to which access has been enabled. The process 1700 may also include sending a response to the second content provider, the response indicating that access to the content item has been authorized.

EXAMPLE CLAUSES

1. A method, implemented via one or more computing devices of a payment service, comprising: storing, in a database associated with the payment service, a user preference to utilize funds associated with a stored balance of a user account for accessing access-restricted content having a particular characteristic without a user associated with the user account providing payment information at a time of a request to access the access-restricted content; receiving, from a content provider, an indication of a request to access a content item associated with the content provider, wherein the content item is access-restricted by the content provider, and wherein: the request to access the content item is received via an application executing in the foreground of a user device of the user; and a payment application, associated with the payment service, is executing in the background of the user device; in response to receiving the indication of the request to access the content item and based at least in part on a determination that the content item is associated with the particular characteristic, withdrawing at least a portion of the funds from the stored balance of the user account without requiring additional input from the user; and based at least in part on withdrawing at least the portion of the funds, enabling access to the content item via the content provider.

2. The method as clause 1 recites, further comprising: storing, in association with the user account, data indicating content items to which access has been enabled; receiving, at a time after enabling access to the content item, an indication of a request to present the content item, wherein the request to present the content item is from a requesting application executing on the user device, wherein the requesting application is either the application or the payment application, and wherein the user interface is presented via the requesting application; determining, from the data, that the content item is one of the content items to which access has been enabled; and causing the content item to be presented via a user interface of the user device.

3. The method as clause 2 recites, further comprising: determining that the content item is associated with the particular characteristic based at least in part on results data from at least one of: natural language processing performed on text data of the content item; image processing performed on image data of the content item; or audio processing performed on audio data of the content item.

4. The method as any of clauses 1, 2, and/or 3 recite, further comprising: receiving, from the user device and while the payment application is executing in the foreground of the user device, a request to view, via the payment application, a user interface associated with an asset; determining, based at least in part on the user interface being displayed, a first portion of the content items to which access has been enabled that are relevant to the asset; causing display, in association with the first portion of the content items, of a first indicator indicating that access to the first portion of the content items has been enabled; and causing display, in association with a second portion of the content items, of a second indicator indicating that access to the second portion of the content items has yet to be enabled, wherein the second portion of the content items are purchasable using the funds associated with the stored balance.

5. A system comprising: one or more processors; and non-transitory computer-readable media storing instructions that, when executed by the one or more processors, cause the system to perform operations comprising: storing a user preference to utilize funds associated with a stored balance of a user account for accessing access-restricted content having a particular characteristic without a user associated with the user account inputting payment information at a time that access to the access-restricted content is requested; receiving, from a content provider, an indication of a request to access a content item associated with the content provider, wherein the request is received while a payment application is executing in a background of a user device of the user; determining the content item is associated with the particular characteristic; based at least in part on the content item being associated with the particular characteristic, withdrawing at least a portion of the funds from the stored balance without additional input from the user; and based at least in part on withdrawing the at least the portion of the funds, enabling access to the content item via the content provider.

6. The system as clause 5 recites, wherein the content item comprises a first content item, the request comprises a first request, and the operations further comprise: receiving an indication of a second request to access a second content item, wherein the second request includes an indication to utilize the payment application to pay for access to the second content item; based at least in part on the second request including the indication to utilize the payment application, withdrawing an additional portion of the funds from the stored balance without requiring the additional input from the user; and based at least in part on withdrawing the additional portion of the funds, enabling access to the second content item.

7. The system as clause 5 and/or 6 recites, wherein the particular characteristic includes at least one of: an identifier of the content provider; a subject matter associated with the content item; a relevance value to a particular asset associated with the user account; or a cost for access being below a dollar amount.

8. The system as any of clauses 5, 6, and/or 7 recite, the operations further comprising: receiving first data indicating that a user interface, of the payment application, is displaying subject matter on the user device; causing, based at least in part on the user interface being displayed, the payment application to display indicators of content items associated with the subject matter; determining a portion of the content items to which access has been enabled; and causing display, in associated with the portion of the content items, of a first indicator that access to the portion of the content items has been enabled.

9. The system as any of clauses 5, 6, 7, and/or 8 recite, the operations further comprising: causing display, on the user device, of a user interface associated with the payment application, the user interface configured to: present one or more options for managing access to content items, the one or more options including subject matters, content types, content providers, and monetary amounts authorized for use in accessing content items; and receive user input associated with the one or more options; receiving user input data representing the user input from the user device, the user input data indicating at least one of: that funds from the payment application are authorized to be utilized to pay for access to content from the content provider; or a monetary amount that is authorized to be utilized to pay for the access to the content from the content provider; generating data representing user preferences including the user preference from the user input data; and determining the particular characteristic based at least in part on the data representing the user preference.

10. The system as recited in any of clauses 5, 6, 7, 8, and/or 9, wherein the request comprises a first request, the content item comprises a first content item, and the operations further comprise: receiving an indication of a second request to access a second content item, the second request received in association with a web browser displaying options for presentation of content; determining that the payment application is operating on a device executing the web browser; determining that the second content item is associated with the particular characteristic; and based at least in part on the payment application operating on the device and the second content item being associated with the particular characteristic, enabling access to the second content item.

11. The system as recited in any of clauses 5, 6, 7, 8, 9, and/or 10, the operations further comprising: storing, in association with the user account, transaction data indicating historical payment for access to content items by the payment application; determining, utilizing a machine learning model trained and based at least in part on the transaction data, a recommendation for at least one of a content subscription or a subscription type associated with the particular characteristic; and causing the payment application to present the recommendation, wherein as presented, the recommendation is actionable to cause configuration of the content subscription or the subscription type.

12. The system as recited in any of clauses 5, 6, 7, 8, 9, 10, and/or 11, the operations further comprising sending the at least the portion of the funds to an account associated with the content provider for payment to the content owner.

13. A computer-implemented method, implemented via one or more computing devices of a payment service, comprising: storing a user preference to utilize funds associated with a user account for accessing access-restricted content having a particular characteristic without a user associated with the user account inputting payment information at a time that access to the access-restricted content is requested; receiving, from a content provider, an indication of a request to access a content item, wherein the request is received while a payment application is executing in a background of a user device of the user; based at least in part on a determination that the content item is associated with the particular characteristic, withdrawing at least a portion of the funds without additional input from the user; and based at least in part on withdrawing the at least the portion of the funds, enabling access to the content item via the content provider.

14. The computer-implemented method as recited in clause 13, wherein the request comprises a first request, and the method further comprises: generating, based at least in part on withdrawing the at least the portion of the funds, an access token associated with the content item; storing the access token in association with the user account; receiving a subsequent request to access the content item in association with the user account; and sending the access token to the content provider, the access token indicating that access to the content item by a device associated with the user account is authorized.

15. The computer-implemented method as recited in clause 13 and/or 14, further comprising: receiving first data indicating that the user device is displaying first subject matter; causing, based at least in part on the user device displaying the first subject matter, a user interface to display indicators of content items associated with the first subject matter; determining a portion of the content items to which access has yet to be enabled; and causing display of the indicators in a ranked order, with the indicators associated with the portion of the content items being ranked more favorably than other ones of the content items.

16. The computer-implemented method as recited in any of clauses 13, 14, and/or 15, further comprising: determining that the content item is associated with an active subscription of the payment service; and facilitating transfer of a portion of the funds from the user account to an account of the payment service based at least in part on the determination that the content item is associated with the active subscription of the payment service.

17. The computer-implemented method as recited in any of clauses 13, 14, 15, and/or 16, further comprising: storing, in association with the user account, first data indicating prior purchases of content access; determining, from the first data and over a period of time, second data indicating at least one of a number of times content access has been purchased from the content provider or a monetary amount provided to the content provider for the content access; identifying content subscriptions associated with the content provider; and generating a recommendation to subscribe to at least one of the content subscriptions based at least in part on the number of times the content access has been purchased or the monetary amount, wherein the particular characteristic of the content item includes an indication that the at least one of the content subscriptions activated.

18. The computer-implemented method as recited in any of clauses 13, 14, 15, 16, and/or 17, wherein the request comprises a first request, the content item comprises a first content item, and the method further comprises: receiving an indication of a second request to access a second content item, the second request received utilizing a user interface of the payment application; causing the user interface to display an option to pay for access to the second content item utilizing the payment application; receiving user input data indicating selection of the option; and based at least in part on receiving the user input data, enabling access to the second content item.

19. The computer-implemented method as any of clauses 13, 14, 15, 16, 17, and/or 18 recite, the operations further comprising: causing display, on the user device, of a user interface associated with the payment application, the user interface configured to: present indications of content publishers; present a first option for causing automatic withdrawal of funds to gain access to content items; present a second option for causing the payment application to request user input confirming withdrawal of the funds to gain access to the content items; and receiving, via the user interface, first user input data indicating selection of the first option in association with a first publisher of the publisher indications; receiving, via the user interface, second user input data indicating selection of the second option in association with a second publisher of the publisher indications; and generating first data representing user preferences including the user preference from the first user input data and the second user input data.

20. The computer-implemented method as any of clauses 13, 14, 15, 16, 17, 18, and/or 19 recite, wherein the request comprises a first request, the content provider comprises a first content provider, and the operations further comprise: storing, in association with the user account, first data indicating content items to which access has been enabled; receiving, from a second content provider unassociated with the first content provider, an indication of a second request to present the content item; determining, from the first data, that the content item is one of the content items to which access has been enabled; and sending a response to the second content provider, the response indicating that access to the content item has been authorized.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 7, 10, and 11 for convenience and ease of understanding. However, the methods illustrated are not limited to being performed using components described in FIGS. 1-6, 8, 9, and 12-17, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, implemented via one or more computing devices of a payment service, comprising:
   storing, in a database associated with the payment service, a user preference to utilize funds associated with a stored balance of a user account for accessing access-restricted digital content having a particular characteristic without a user associated with the user account providing payment information at a time of a request to access the access-restricted digital content, wherein the particular characteristic is associated with metadata analysis associated with the access-restricted digital content;
   receiving first data indicating display of subject matter on a user device of the user through a first user interface of an application executing in a foreground of the user device;
   causing, based at least in part on the receiving of the first data, the first user interface to include indicators of digital content items associated with the subject matter;
   receiving, from a content provider, an indication of the request to access a digital content item associated with the content provider, wherein the digital content item is access-restricted by the content provider, and wherein:
      the request to access the digital content item is received via the first user interface of the application; and
      a payment application, associated with the payment service, executes is executing in a background of the user device;
   determining a portion of the digital content items to which access has been enabled, wherein the portion of the digital content items includes the digital content item;
   analyzing metadata associated with the digital content item using at least a text-based analysis to determine that the digital content item is associated with the particular characteristic;
   in response to the receiving of the indication of the request to access the digital content item and based at least in part on the determination that the digital content item is associated with the particular characteristic, withdrawing at least a portion of the funds from the stored balance of the user account without requiring additional input from the user;
   based at least in part on the withdrawing of at least the portion of the funds, enabling access to the digital content item via the content provider; and
   causing output, via the first user interface, of an access indicator that the access to the digital content item is enabled.

2. The method of claim 1, further comprising:
   storing, in association with the user account, data indicating one or more digital content items to which access has been enabled;
   receiving, after enabling access to the digital content item, an indication of a request to present the digital content item, wherein the request to present the digital content item is from a requesting application executing on the user device, wherein the requesting application is either the application or the payment application, and wherein a second user interface is presented via the requesting application;
   determining, from the data, that the digital content item is one of the digital content items to which access has been enabled; and
   causing the digital content item to be presented via the second user interface of the user device.

3. The method of claim 2, wherein the determination that the digital content item is associated with the particular characteristic is based on the analysis of the metadata and is based at least in part on results data from at least one of:
   natural language processing performed on text data of the digital content item;
   image processing performed on image data of the digital content item; or
   audio processing performed on audio data of the digital content item.

4. The method of claim 2, further comprising:
   receiving, from the user device, a request to view, via the payment application, a third user interface associated with an asset;
   determining, based at least in part on the third user interface being displayed, a first portion of the digital content items to which access has been enabled that are relevant to the asset, wherein the first portion of the digital content items includes the digital content item;
   causing display, in association with the first portion of the digital content items, of a first indicator indicating that access to the first portion of the digital content items has been enabled; and
   causing display, in association with a second portion of the digital content items, of a second indicator indicating that access to the second portion of the digital content items has yet to be enabled, wherein the second portion of the digital content items are purchasable using the funds associated with the stored balance.

5. A system comprising:
   one or more processors; and
   non-transitory computer-readable media storing instructions that, when executed by the one or more processors, cause the one or more processors to perform operations comprising:
      storing a user preference to utilize funds associated with a stored balance of a user account for accessing access-restricted digital content having a particular characteristic without a user associated with the user account inputting payment information at a time that access to the access-restricted digital content is requested, wherein the particular characteristic is associated with metadata analysis associated with the access-restricted digital content;

receiving first data indicating display of subject matter on a user device of the user through a first user interface of an application executing in a foreground of the user device;

causing, based at least in part on the receiving of the first data, the first user interface to include indicators of digital content items associated with the subject matter;

receiving, from a content provider, an indication of a request to access a digital content item associated with the content provider, wherein:
  the request is received via the first user interface of the application; and
  a payment application executes in a background of the user device of the user;

determining a portion of the digital content items to which access has been enabled, wherein the portion of the digital content items includes the digital content item;

analyzing metadata associated with the digital content item using at least a text-based analysis to determine that the digital content item is associated with the particular characteristic;

based at least in part on the determination that the digital content item is associated with the particular characteristic, withdrawing at least a portion of the funds from the stored balance without additional input from the user;

based at least in part on the withdrawing of at least the portion of the funds, enabling access to the digital content item via the content provider; and causing output, via the first user interface, of an access indicator that the access to the digital content item is enabled.

6. The system of claim 5, the operations further comprising:
receiving an indication of a second request to access a second digital content item, wherein the second request includes an indication to utilize the payment application to pay for access to the second digital content item;
based at least in part on the second request including the indication to utilize the payment application, withdrawing an additional portion of the funds from the stored balance without requiring the additional input from the user; and
based at least in part on the withdrawing of the additional portion of the funds, enabling access to the second digital content item.

7. The system of claim 5, the operations further comprising:
causing display, on the user device, of a second user interface associated with the payment application, the second user interface configured to present one or more options for managing access to the digital content items, the one or more options including subject matters, content types, content providers, and monetary amounts authorized for use in accessing the digital content items;
receiving user input data representing a user input from the user device, the user input associated with at least one of the one or more options, the user input data indicating at least one of:
  that funds from the payment application are authorized to be utilized to pay for access to the digital content item from the content provider; or
  a monetary amount that is authorized to be utilized to pay for the access to the digital content item from the content provider;
generating data representing one or more user preferences, the one or more user preferences including the user preference from the user input data; and
determining the particular characteristic based at least in part on the data representing the one or more user preferences.

8. The system of claim 5, the operations further comprising:
receiving an indication of a second request to access a second digital content item, the second request received in association with a web browser displaying options for presentation of digital content;
determining that the payment application is operating on a device executing the web browser;
determining that the second digital content item is associated with the particular characteristic; and
based at least in part on the payment application operating on the device and the second digital content item being associated with the particular characteristic, enabling access to the second digital content item.

9. The system of claim 5, the operations further comprising:
storing, in association with the user account, transaction data indicating historical payment data for access to one or more digital content items by the payment application;
determining, utilizing a machine learning model trained and based at least in part on the transaction data, a recommendation for at least one of a content subscription or a subscription type associated with the particular characteristic; and
causing the payment application to present the recommendation, wherein as presented, the recommendation is actionable to cause configuration of at least one of the content subscription or the subscription type.

10. The system of claim 5, the operations further comprising sending at least the portion of the funds to an account associated with the content provider for payment to a content owner associated with the digital content item.

11. A computer-implemented method, implemented via one or more computing devices of a payment service, the computer-implemented method comprising:
storing a user preference to utilize funds associated with a user account for accessing access-restricted digital content having a particular characteristic without a user associated with the user account inputting payment information at a time that access to the access-restricted digital content is requested, wherein the particular characteristic is associated with metadata analysis associated with the access-restricted digital content;
receiving first data indicating display of subject matter on a user device of the user through a user interface of an application executing in a foreground of the user device;
causing, based at least in part on the receiving of the first data, the user interface to include indicators of digital content items associated with the subject matter;
receiving, from a content provider, an indication of a request to access a digital content item, wherein the request is received while a payment application executes in a background of the user device of the user, wherein the digital content item is access-restricted, and wherein the request is received via the user interface;

determining a portion of the digital content items to which access has been enabled, wherein the portion of the digital content items includes the digital content item;

analyzing metadata associated with the digital content item using at least a text-based analysis to determine that the digital content item is associated with the particular characteristic;

based at least in part on the determination that the digital content item is associated with the particular characteristic, withdrawing at least a portion of the funds without additional input from the user;

based at least in part on the withdrawing of at least the portion of the funds, enabling access to the digital content item via the content provider; and causing output, via the user interface, of an access indicator that the access to the digital content item is enabled.

12. The computer-implemented method of claim 11, further comprising:

generating, based at least in part on the withdrawing of at least the portion of the funds, an access token associated with the digital content item;

storing the access token in association with the user account;

receiving a subsequent request to access the digital content item in association with the user account; and sending the access token to the content provider, the access token indicating that access to the digital content item by a device associated with the user account is authorized.

13. The computer-implemented method of claim 11, further comprising:

causing display of the indicators in a ranked order, wherein a subset of the indicators that is associated with the portion of the digital content items is ranked more favorably than one or more other digital content items of the digital content items according to the ranked order.

14. The computer-implemented method of claim 11, further comprising:

determining that the digital content item is associated with an active subscription using the payment service; and facilitating transfer of at least the portion of the funds from the user account to an account of the payment service based at least in part on the determining that the digital content item is associated with the active subscription using the payment service.

15. The computer-implemented method of claim 11, further comprising:

storing, in association with the user account, the first data indicating prior purchases associated with digital content access;

determining, based on the first data, second data indicating at least one of a number of times that the digital content access has been purchased from the content provider over a period of time or a monetary amount provided to the content provider for the digital content access over the period of time;

identifying one or more content subscriptions associated with the content provider; and generating a recommendation to subscribe to at least one of the one or more content subscriptions based on at least one of the number of times or the monetary amount, wherein the particular characteristic of the digital content item includes an indication that the at least one of the one or more content subscriptions is activated.

16. The computer-implemented method of claim 11, further comprising:

receiving an indication of a second request to access a second digital content item, the second request received utilizing the user interface of the payment application;

causing the user interface to display an option to pay for access to the second digital content item utilizing the payment application;

receiving user input data indicating selection of the option via the user interface; and in response to the receiving of the user input data, enabling access to the second digital content item.

17. The computer-implemented method of claim 11, further comprising:

causing display, on the user device, of a second user interface associated with the payment application, the second user interface configured to:

present publisher indications of content publishers;

present a first option for causing automatic withdrawal of funds to gain access to digital content items; and present a second option for causing the payment application to request user input confirming withdrawal of the funds to gain access to the digital content items;

receiving, via the second user interface, first user input data indicating selection of the first option in association with a first publisher of the publisher indications;

receiving, via the second user interface, second user input data indicating selection of the second option in association with a second publisher of the publisher indications; and generating first data representing one or more user preferences, the one or more user preferences including at least the user preference, wherein the user preference is based on at least the first user input data and the second user input data.

18. The computer-implemented method of claim 11, further comprising:

storing, in association with the user account, first data indicating digital content items to which access has been enabled;

receiving, from a second content provider unassociated with the content provider, an indication of a second request to present the digital content item;

determining, from the first data, that the digital content item is one of the digital content items to which access has been enabled; and sending a response to the second content provider, the response indicating that access to the digital content item has been authorized.

19. The system of claim 5, wherein the funds include at least one of a fiat currency, a non-fiat currency, a cryptocurrency, a non-fungible token, a security, a stock, or a gift card.

20. The system of claim 5, wherein analyzing the metadata associated with the digital content item further includes using at least one of a word-based analysis, an image analysis, and an audio-based analysis.

* * * * *